(12) United States Patent
Hoshino

(10) Patent No.: US 7,108,188 B2
(45) Date of Patent: Sep. 19, 2006

(54) METHOD FOR CONTROLLING A LIBRARY APPARATUS, PROGRAM AND UNITS

(75) Inventor: Keisuke Hoshino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/151,461

(22) Filed: Jun. 14, 2005

(65) Prior Publication Data

US 2005/0230470 A1    Oct. 20, 2005

Related U.S. Application Data

(63) Continuation of application No. PCT/JP03/08274, filed on Jun. 30, 2003.

(51) Int. Cl.
*G06K 7/10* (2006.01)
(52) U.S. Cl. .................................. 235/462.13
(58) Field of Classification Search ............ 235/462.13
See application file for complete search history.

(56) References Cited

U.S. PATENT DOCUMENTS

| | | | |
|---|---|---|---|
| 5,450,385 A | | 9/1995 | Ellis et al. |
| 6,138,909 A | * | 10/2000 | Rockwell et al. ........... 235/383 |
| 6,246,642 B1 | | 6/2001 | Gardner, Jr. et al. |
| 6,265,705 B1 | | 7/2001 | Gardner, Jr. et al. |
| 6,466,389 B1 | * | 10/2002 | Ochi et al. ..................... 360/69 |
| 2002/0085579 A1 | * | 7/2002 | Sullivan et al. ............. 370/428 |

FOREIGN PATENT DOCUMENTS

| | | |
|---|---|---|
| JP | 7-210971 | 8/1995 |
| JP | 9-91930 | 4/1997 |
| JP | 11045306 | 2/1999 |

OTHER PUBLICATIONS

Communication for the European Patent Office in application No. EP 04 25 8037 dated Jun. 27, 2005 enclosing European search report.

* cited by examiner

*Primary Examiner*—Daniel Stcyr
(74) *Attorney, Agent, or Firm*—Westerman, Hattori, Daniels & Adrian, LLP.

(57) ABSTRACT

The inventory processing unit reads by the barcode reader barcode labels of medium cartridges by scanning a plurality of times per one label as the carrier robot is moved in a predetermined cell array direction in the medium storage and notifies of stored medium information the high-order device. The cause of error specification processing unit extracts the error data from the scanning data obtained at the completion of the inventory process to determine the presence or absence of a barcode label and if it is determined that a barcode label exists, the predetermined retry process is executed, otherwise, notifies of the determination result the high-order device without executing the retry process.

21 Claims, 23 Drawing Sheets

METHOD FOR CONTROLLING A LIBRARY APPARATUS, PROGRAM AND UNITS

This application is a continuation of PCT/JP03/08274, filed Jun. 30, 2003.

BACKGROUND OF THE INVENTION

1. Field of the Invention

The present invention relates to a method for controlling a library apparatus to automatically read barcode labels of recording medium such as magnetic tape cartridges stored in cells using a line scanning type reader installed in a medium carrier robot, a program and units. Especially, a method for controlling a library apparatus to efficiently handle the error caused by scanning the recording medium which is not affixed the barcode label, a program and units.

2. Description of the Related Arts

In conventional library apparatus, medium cartridges such as magnetic tape cartridges affixed the barcode labels are stored by cell in a plurality of storage cells provided in the housing. The medium cartridges are picked up by the carrier robot from the storage cells designated as the origin according to the move command from the host, conveyed to a drive module as the destination by the move command and put into the drive module so that the medium are recorded or reproduced. The recorded or reproduced medium cartridges are picked up by the carrier robot from the drive module designated as the origin according to the move command from the host and turned back to the storage cells designated as the destination according to the move command.

The medium cartridge is affixed the barcode label which is recorded medium control information on the back surface thereof when it is put into the library apparatus. The barcode label of the medium is read by a barcode reader installed in the carrier robot. The barcode reader is provided with a LED lighting unit in which LEDs are linearly arranged and a one-dimensional CCD. The barcode label is scanned by the one-dimensional CCD while the LED lighting unit is turn on thereby the barcode label can be read.

(Patent document 1)
Japanese Patent Application Laid-Open Publication No. 11-45306
(Patent document 2)
Japanese Patent Application Laid-Open Publication No. 2000-260089

In the library apparatus, an inventory operation to continuously read barcode labels of a number of medium cartridges stored in the apparatus and notify the host of the location and type of the medium cartridges when the necessary number of medium cartridges are put into the library apparatus and stored in the cells to start the operation. The minimum operation unit of the inventory operation is one column as a longitudinal line of the storage cells in a storage cabinet in the apparatus. That is to say, the inventory operation is performed such that the carrier robot is moved and positioned at the top of cell location in the column targeted for processing, then the carrier robot is moved up and down at a regular speed as the barcode reader is scanning to continuously read the barcode labels.

However, the medium cartridge which is not affixed the barcode label is sometimes stored in the library apparatus due to forget to affix the label or come off it. When such medium cartridge which is not affixed the barcode label is scanned by the barcode reader in the inventory operation, it can be not determined the cause of the error whether a barcode label is not affixed, the barcode label is fouling or the barcode reader is at fault by only the scanning data obtained as the reading result.

Therefore, in the conventional library apparatuses, in case of the error data is extracted from the reading result at the time the inventory operation for one column is completed, a diagnosis process is executed to determine which of a failure of the barcode reader or a defect of the barcode label is the cause of error. If it is no problem, the barcode label accounted for the error is subjected to the retry operation.

FIG. 22 is a flowchart of the conventional inventory process, which is following procedure:

Step S1: Designate a target column which is performed the inventory operation, and move to the carrier robot to the top cell of the target column and position thereto.

Step S2: Continuously read the barcode labels of the medium cartridges stored in the column by moving up and down the carrier robot as scanning by the barcode reader (inventory operation).

Step S3: Check the presence or absence of any error in the reading result. If there is any error, advance to a step S4, otherwise, the process is completed.

Step S4: If the diagnosis condition for the barcode reader that all of the plurality of scanning data for the same medium (three scanning data for each medium)are error data is fulfilled, advance to Step S5, otherwise advance to Step S6.

Step S5: Move the carrier robot to the medium cartridge to be error and position thereto, and execute a diagnosis process for the barcode reader.

Step S6: Move the carrier robot to the medium cartridge to be error and position thereto, and execute a retry process.

In the retry process, the label range of the medium cartridge is divided into three regions such as an upper section, a middle section and a lower section, and each region is subdivided into five steps of scanning position. The barcode reader repeatedly operates so called stop-scanning to read by exposing during a predetermined period while the barcode reader is fixedly positioned for each scanning position. The method using such retry process is useful for in the case that the barcode is fouling, however if a barcode label is not affixed to the medium cartridge, unnecessary retry operations are repeated the fixed times (for example, the stop-scanning operations are repeated the prescribed times such as fifteen times as the maximum number of times for retry)so that the process time is lengthened.

SUMMARY OF THE INVENTION

The object of the present invention is that a method for controlling a library apparatus to improve the process performance by shortening the processing time for the recording medium which is not affixed a barcode label in the inventory operation, a program and units are provided.

The present invention provides the library apparatus comprising a medium storage which has a plurality of storage cells to store the reading medium affixed the barcode labels, a recording/reproducing unit to either record or reproduce information using the reading medium, a medium conveyor to convey the reading medium between the medium storage and the recording/reproducing unit, and a reader (barcode reader) which is installed in the medium conveyor and optically reads the barcode label of the reading medium by line scanning with one-dimensional imaging pixels.

The above described library apparatus of the present invention is characterized in that an inventory processing unit to read by the reader barcode labels of the recording medium by scanning plurality times for each label as moving the medium conveyor and notify of the stored medium information, and a cause of error specification processing unit to extract error data from the reading result obtained by the inventory processing unit and determine the presence or absence of barcode label, perform the predetermined retry process if it is determined that the barcode exists, otherwise, report the determination result without performing the retry process are provided.

According to such library apparatus of the present invention, if the recording medium which is not affixed the barcode label is scanned in the inventory operation, the error data is extracted among the barcode label data obtained by the inventory operation and the cause of error identification processing is performed. Where, if it is determined not to exist the label, the operation is not shifted to the retry process so that the recording medium which is not affixed the label is prevented from being performed the unnecessary retry process so that needless operation is not performed thereby the process is shortened and the process performance is improved.

The cause of error specification processing unit of the present invention makes a label determination processing unit perform a determination process based on the assumption that a barcode label does not exist if all of the plurality of scanning data for one recording medium are error data and the reading result of the ahead and behind recording medium are normal. In the label determination process, the following three cases are determined that a label does not exist.

(Case 1)

The label determination processing unit determines whether any barcode pattern exists or not in the scanning data which is determined to be error, and if it does not exist a barcode pattern, determines not to exist a label provided that more than threshold value of black pixels or white pixels are arranged at the center of the data.

(Case 2)

The label determination processing unit determines the presence or absence of a start code or stop code (determines an error caused by a diffuse reflection and a pattern)if any barcode pattern exists in the scanning data which is determined to be an error, and if neither the start code or the stop code exists, determines that a label does not exist provided that more than the threshold value of black pixels and white pixels are arranged at the center of the data.

(Case 3)

The label determination processing unit determines whether N/W ratio (N is thick/thin ratio and W is thick element width) and a thin element width are within the standard value (determines a fouling) if either the start code or the stop code exists in the scanning data which is determined to be an error, and if they are within the standard value, determines that a label does not exist provided that more than the threshold value of black pixels and white pixels are arranged at the center of the data.

The label determination processing unit determines whether a plurality of scanning data read from the same recording medium are similar or not if more than the threshold value of black pixels and white pixels are not arranged at the center of the data in the case1-case3, and if the plurality of scanning data are similar, the label is determined to be a below the standard, otherwise, the label is determined to be a handwriting label.

The cause of the error identification processing unit of the present invention makes a reader's failure determination unit perform a determination process based on the assumption that the reader is at fault if all of the plurality of the scanning data for the barcode label are the error data and the reading result of the ahead and behind recording medium are not normal. The reader's failure determination unit determines white/black ratio of the scanning data, and if the white/black ratio is not normal, a stop-scanning to read by exposing during the predetermined period while the reader is moved by the medium conveyor to the recording medium scanned the error data and fixedly positioned. If the scanning is failed and the white/black ratio is normal, the stop-scanning is repeated a predetermined times, and if all of the plurality of scanning data are similar, it is determined that the reader is wrong. Additionally, the reader's failure determination processing unit determines to be no label when the stop-scanning is failed and the white/black ratio is not normal.

A retry processing unit of the present invention performs the stop-scanning to read by exposing during the predetermined period such that the scanning frequency for the predetermined reading range is the multiple of the scanning frequency of the inventory processing unit while the reader is moved by the medium conveyor to the recording medium scanned the error data and fixedly positioned. For example, in the retry processing unit, the reading range of the recording medium is divided into three regions of upper, middle and lower part, and each region is stop-scanned at least five times every predetermined moving pitch.

The present invention is characterized in that the computer for the library apparatus comprises the medium storage to store the reading medium affixed the barcode label in a plurality of storage cells by cell, a plurality of recording/reproducing device to record and reproduce information using the recording medium, the medium conveyor to convey the reading medium between the medium storage and the recording/reproducing device according to the move command from the high-order device and the reader to optically read the barcode of the recording medium carried on the medium conveyor, and the computer performs the following steps:

an inventory processing step to read by the reader the barcode of the reading medium by scanning a plurality times as moving the medium conveyor in the predetermined cell array direction of the medium storage and notify of the stored medium information to the high-order device; and a cause of error specification processing step to determine the presence or absence of the barcode label by extracting the error data from the reading result obtained at the completion of the inventory processing step, execute the predetermined retry step if it is determined that a barcode label exists and report the determination result to the high-order device without executing the retry processing step if it is determined that a barcode label does not exist.

The present invention provides a method for controlling the library apparatus comprising a medium storage to store the reading medium affixed the barcode label in a plurality of storage cells by cell, a plurality of recording/reproducing device to record and reproduce information using the reading medium, a medium conveyor to convey the reading medium between the medium storage and the recording/reproducing device according to the move command from the high-order device and a reader to optically read the barcode of the reading medium carried on the medium conveyor by line scanning with one-dimensional imaging pixels. The method for controlling the library apparatus of the present invention is characterized in that the following steps are provided: an inventory processing step to read by the reader the barcode of the reading medium by scanning a plurality times as moving the medium conveyor in the predetermined cell array direction of the medium storage and notify of the stored medium information to the high-order device; and a cause of error specification processing step to determine the presence or absence of the barcode label by extracting the error data from the reading result obtained at the completion of the inventory processing step, execute the predetermined retry processing step if it is determined that a barcode label exists and report the determination result to the high-order device without executing the retry processing step if it is determined that a barcode label does not exist.

Incidentally, the detail of the program and the method for controlling the library apparatus are essentially same as the library apparatus.

Other objects, features and advantages of the present invention will become apparent upon reading the following brief description of the drawing and detailed description of the preferred embodiment.

BRIEF DESCRIPTION OF THE DRAWINGS

FIG. 6 is looked from below;

DETAILED DESCRIPTION OF THE PREFERRED EMBODIMENTS

Figure 1:
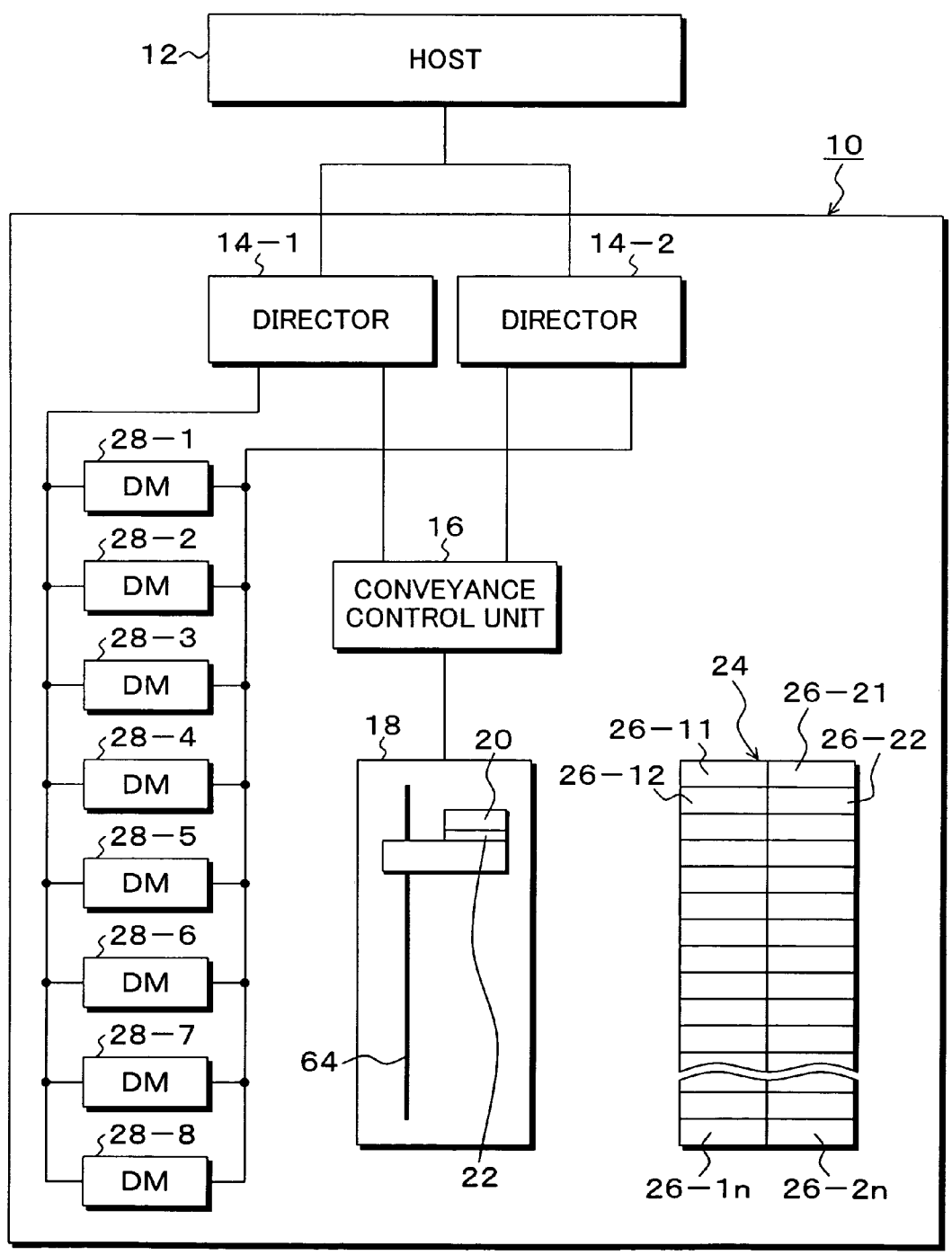
FIG. 1 is a block diagram of the hardware configuration of the library apparatus according to the present invention.

FIG. 1 is a block diagram of the hardware configuration of the library apparatus according to the present invention. In FIG. 1, the library apparatus 10 of the present invention is connected a host 12. The library apparatus 10 is provided with a double director (switch unit) 14-1 and 14-2, a conveyance control unit 16, a conveyor 18, a cartridge storage cabinet 24, and eight drive modules to 28-1 from 28-8 as a recording/reproducing device. The number of drive modules can be changed within 1–16 according to the model building. The conveyor 18 is provided with a robot 20 moving in a longitudinal direction (Y direction) along a Y rail 64. A barcode reader 22 is installed into the carrier robot 20. A cartridge storage cabinet 24 is provided with a plurality of storage cells from 26-11 to 26-1n and from 26-21 to 26-2n which are stacked in two columns for example. In the present embodiment, magnetic tape cartridges as medium cartridges are stored in the cells of the cartridge storage cabinet 24. The director 14-1 operate as the main among the double director 14-1 and 14-2. On receiving such as read command of the cartridge medium from the host 12, the director 14-1 transfers the move command contained in the read command to a conveyance control unit 16. The conveyance control unit 16 recognizes a destination address (To address) from an origin address (From address). If it is the move command to pick up the medium cartridge from the cartridge storage cabinet 24 and input the device module, the conveyance control unit 16 makes the carrier robot 20 of the conveyor 18 position at the cell 26-11 of the cartridge storage cabinet 24, which is the origin address, pick up the cartridge medium stored in the cell, move to the drive module such as 28-11 designated by the destination address and input the cartridge medium in the drive module 28-11. Receiving the notice of the completion of the move command from the conveyance control unit 16, the director 14-1 transmits a startup command to the destination drive module 28-1 to reproduce the cartridge medium and transfers the read data obtained during reproducing to the host 12. If the director 14-1 receives the write command from the host 12, the medium cartridge is conveyed as described above. In such library apparatus 10, when a number of cartridge medium are inputted into the apparatus and the operation is started, the inventory process that the barcode labels affixed the medium cartridges stored in the cartridge cabinet 24 are continuously read by the barcode reader 22 of the carrier robot 20 to notify the host 12 of information which indicates the type of the medium stored. In such inventory process according to the present invention, the error data is extracted among the scanning data at the completion of the inventory process and the error data is analyzed, and if it is determined to be no label, the determination result of no label is notified the host 12 without executing a retry process.

Figure 2:
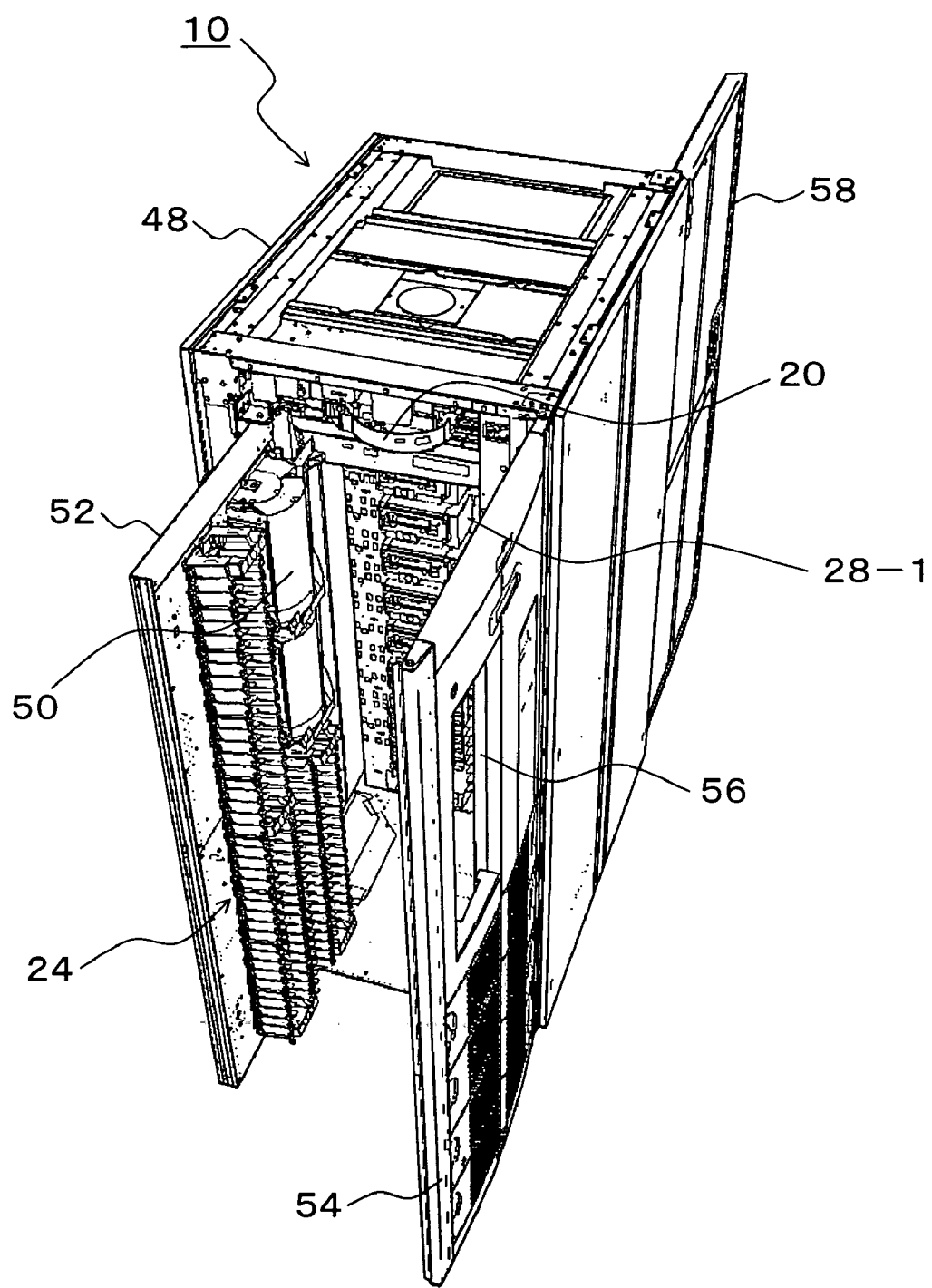
FIG. 2 is an explanatory view of the library apparatus showing the interior by opening the door.
Figure 3:
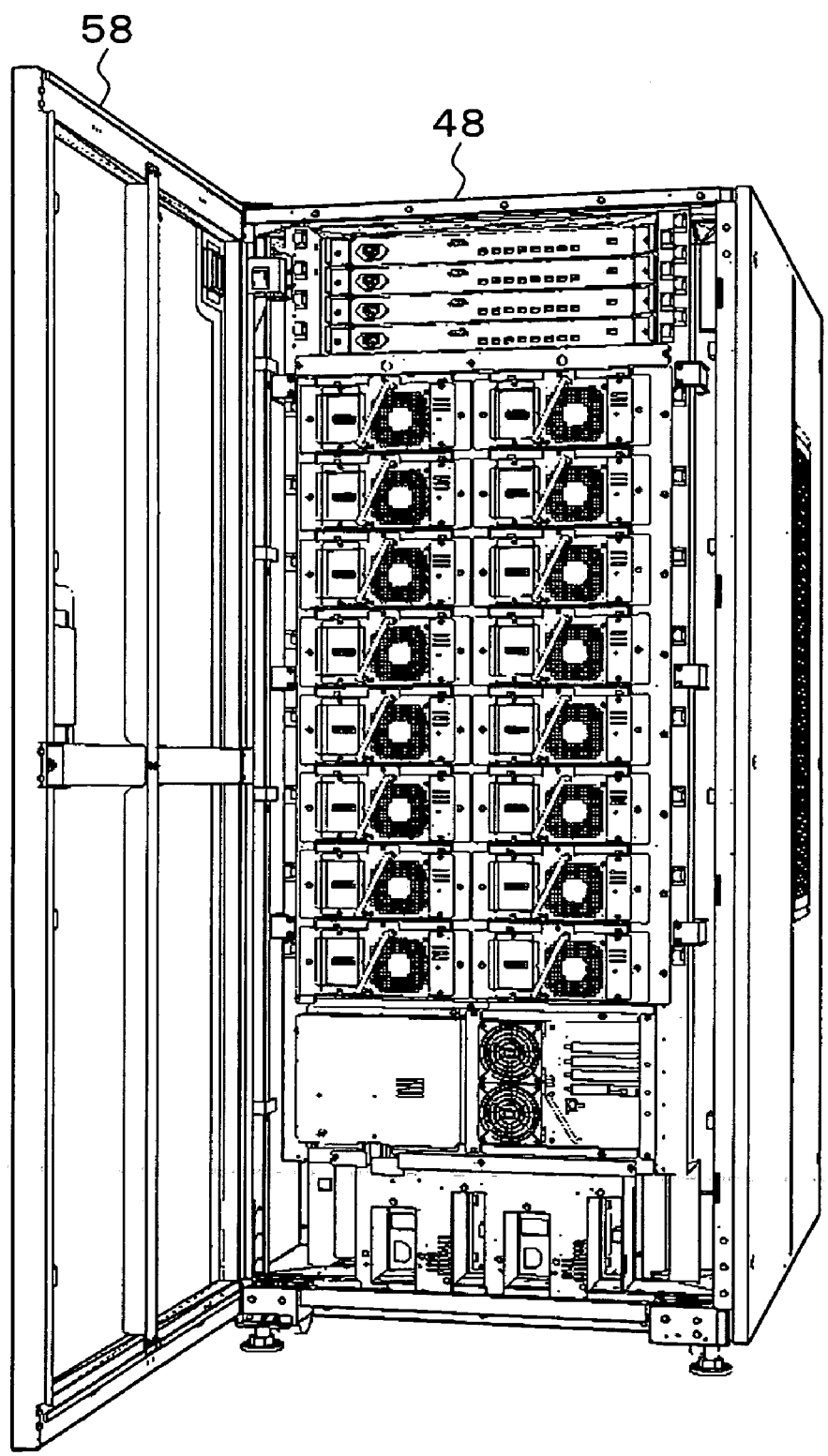
FIG. 3 is an explanatory view of the library apparatus looking from the back door.

FIG. 2 is an explanatory view of the library apparatus 10 showing the interior by opening the door. The library apparatus 10 has a housing 48. An inner door 52 is provided inside a front door 54 in the housing 48. A cartridge storage cabinet 24 in which the storage cells are arranged in multistage inside the inner door 52. A cartridge input/output mechanism 50 is provided in two-stage form for example. An input/output opening door 56 is provided in the front door 54 such that the input/output opening door 56 corresponds to the cartridge input/output mechanism 50. The drive module 28-1, 28-2 - - - are disposed at the position opposite the cartridge storage cabinet 24 inside the inner door of the housing 48. Where the cartridge input/output surfaces of the drive module 28-1, 28-2 - - - are directed inside the housing. The carrier robot 20 is disposed at the upper part of the 28-1 and this positional information is the initial position of the carrier robot 20. FIG. 3 is a figure of the library apparatus 10 of the present invention looked from a back door 58.

Figure 4:
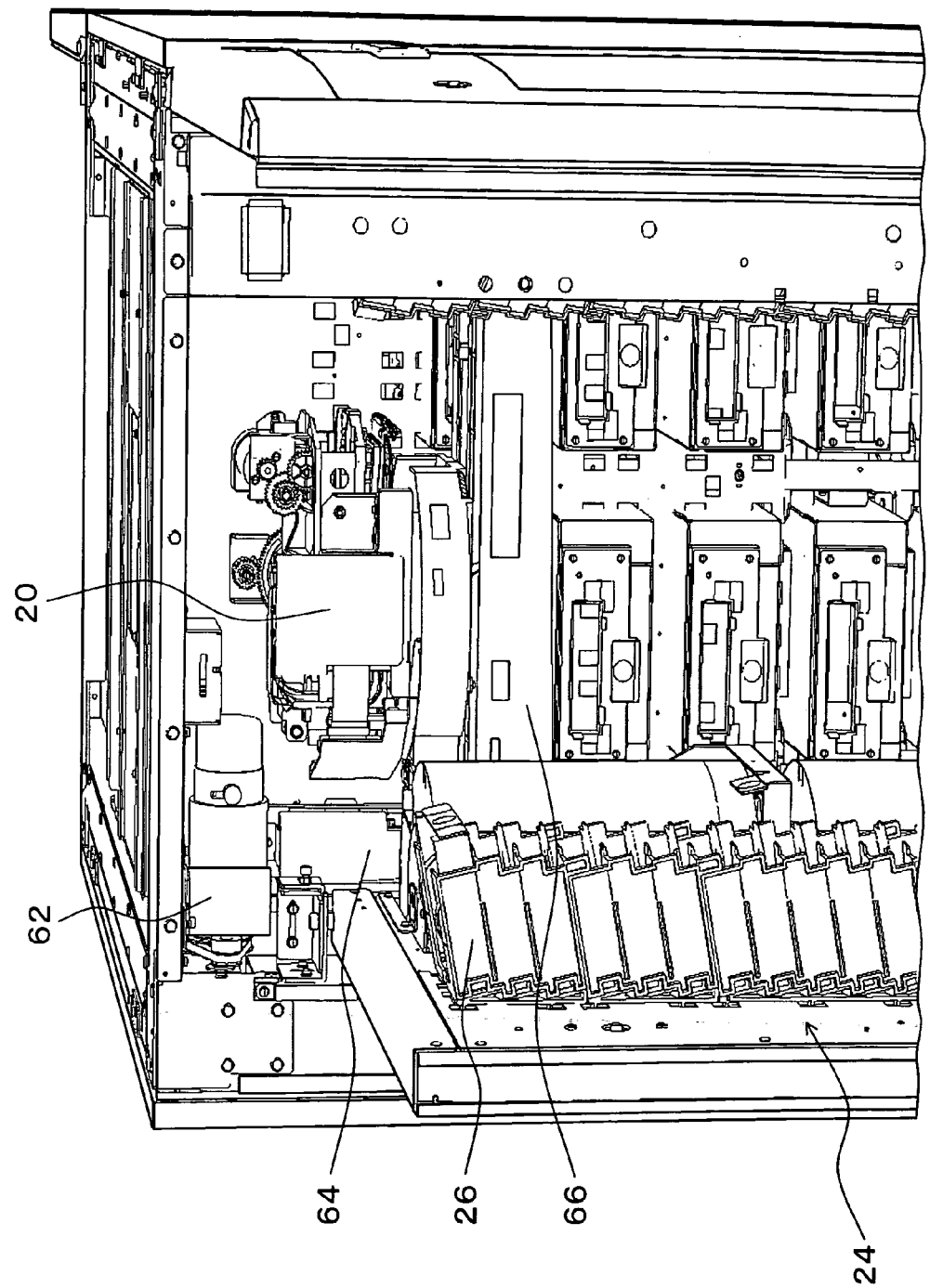
FIG. 4 is an explanatory view enlarging the position of the carrier robot of FIG. 2

FIG. 4 is an enlarged view of the portion where the carrier robot 20 is disposed in the library apparatus 10 in FIG. 2. A Y rail 64 is disposed on the left side of the housing 48. The carrier robot 20 is mounted on a X stage 66 which slidably moves in the longitudinal direction to the Y rail 64. The X stage 66 on which the carrier robot is mounted is moved in the longitudinal direction by belt drive of a motor for Y move 62. The cartridge storage cabinet 24 provided inside the inner door 52 is provided with the cells 26 which is stacked in multistage and inclined such that the aperture is upwards. The medium cartridge 60 is stored in the cell 26 such shat the back end of the cartridge protrudes from the aperture of the cell 26 as shown in the top of the cells 26 of the figure.

Figure 5:
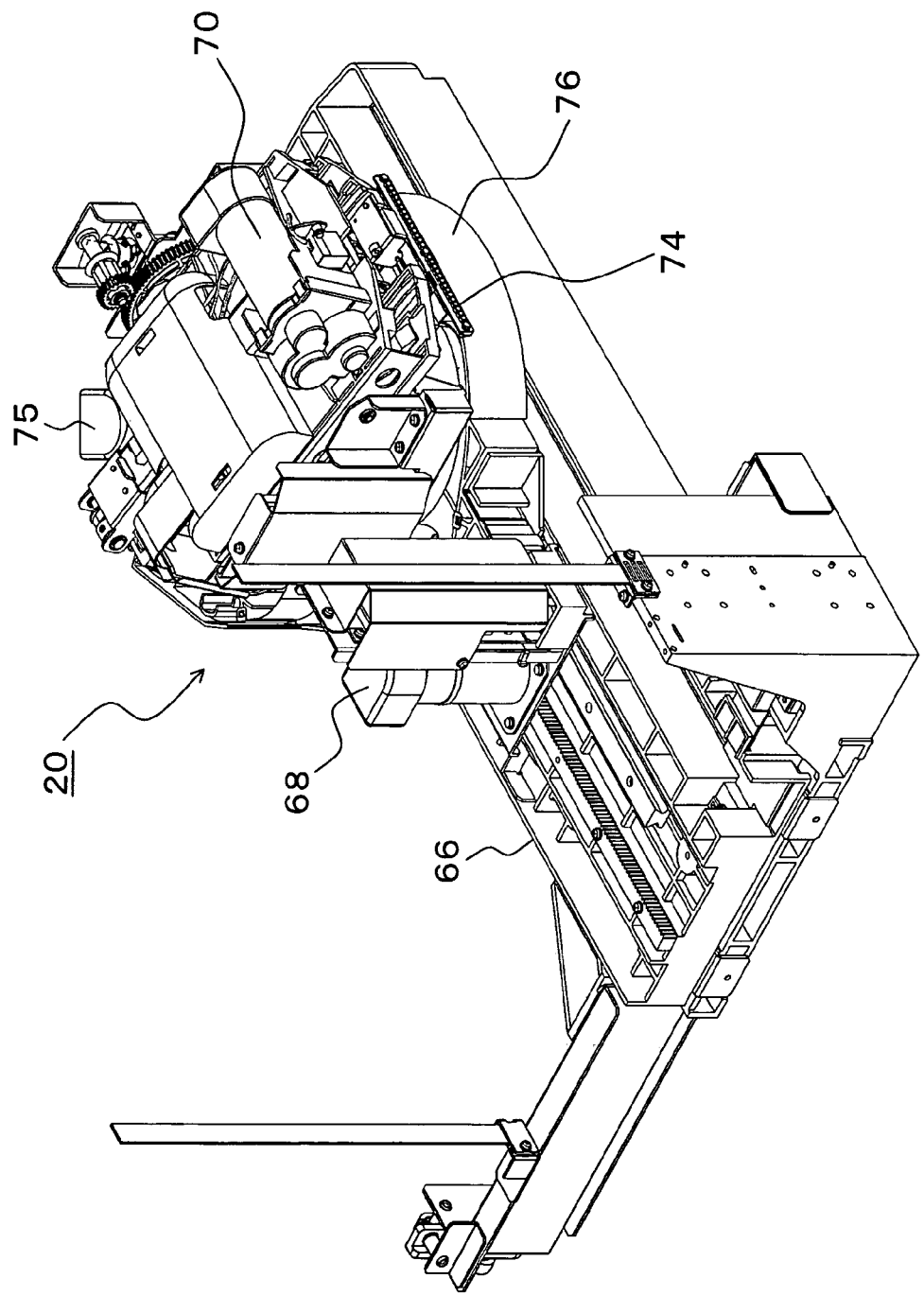
FIG. 5 is an explanatory view of the carrier robot and the lift together of the library apparatus.

FIG. 5 is a figure of the carrier robot 20 in the library apparatus of the present invention together with the X stage 66. The carrier robot 20 mounted on the X stage 66 can move in a horizontal direction by a motor for X move 68. The carrier robot 20 is mounted on a turn table 76 of the X stage 66 and can be turned on the X stage 66 by a motor for turning 75. A back and forth move motor for hooking 70 is mounted on the carrier robot 20. The inserted paw for hooking is taken in and out by the rotational control of the back and forth move motor for hooking 70 to picked up the cartridge. A lighting LED unit 74 is disposed at the medium cartridge pick up side of the carrier robot 20.

Figure 6:
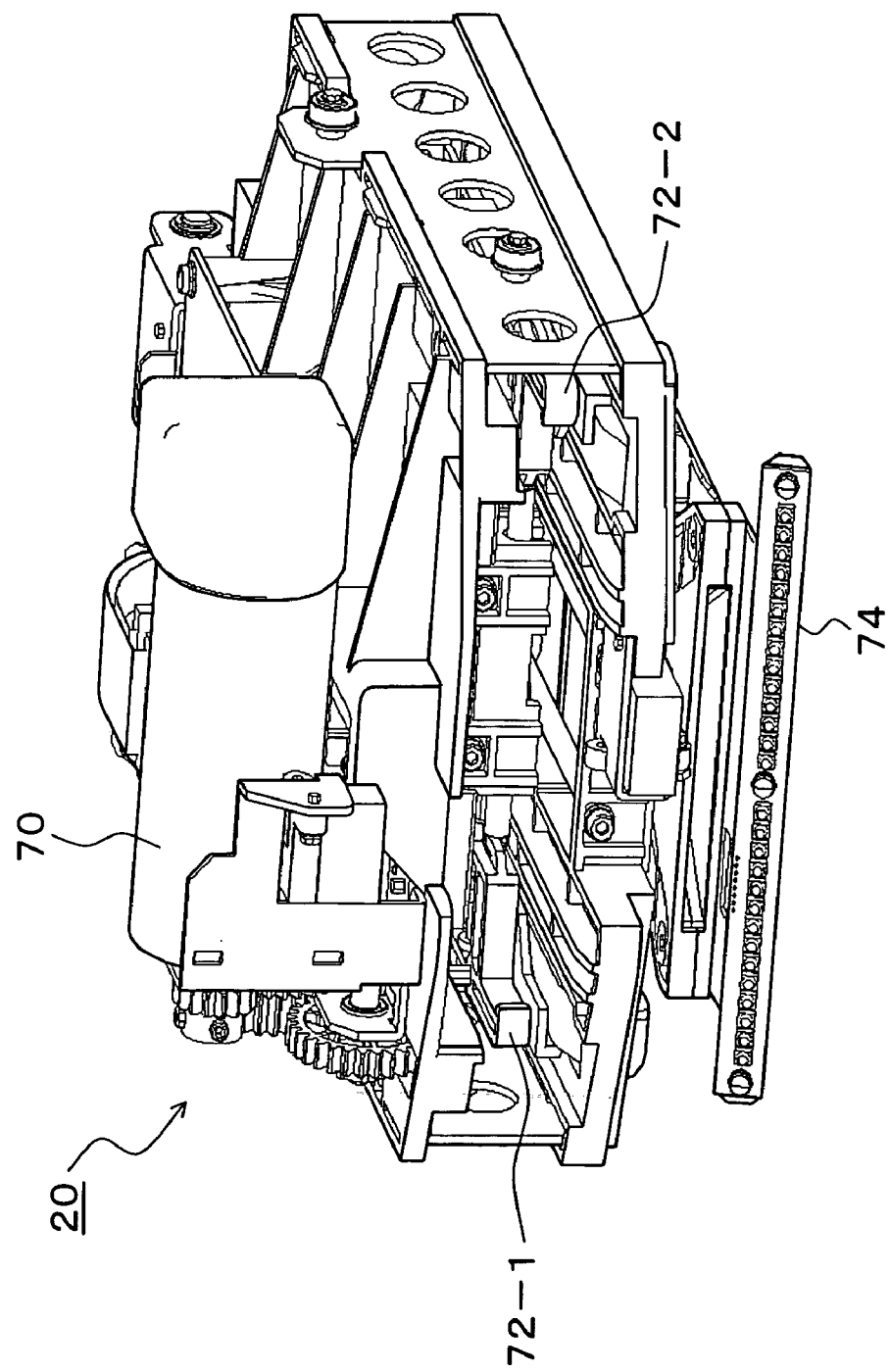
FIG. 6 is an explanatory view of the only carrier robot.
Figure 7:
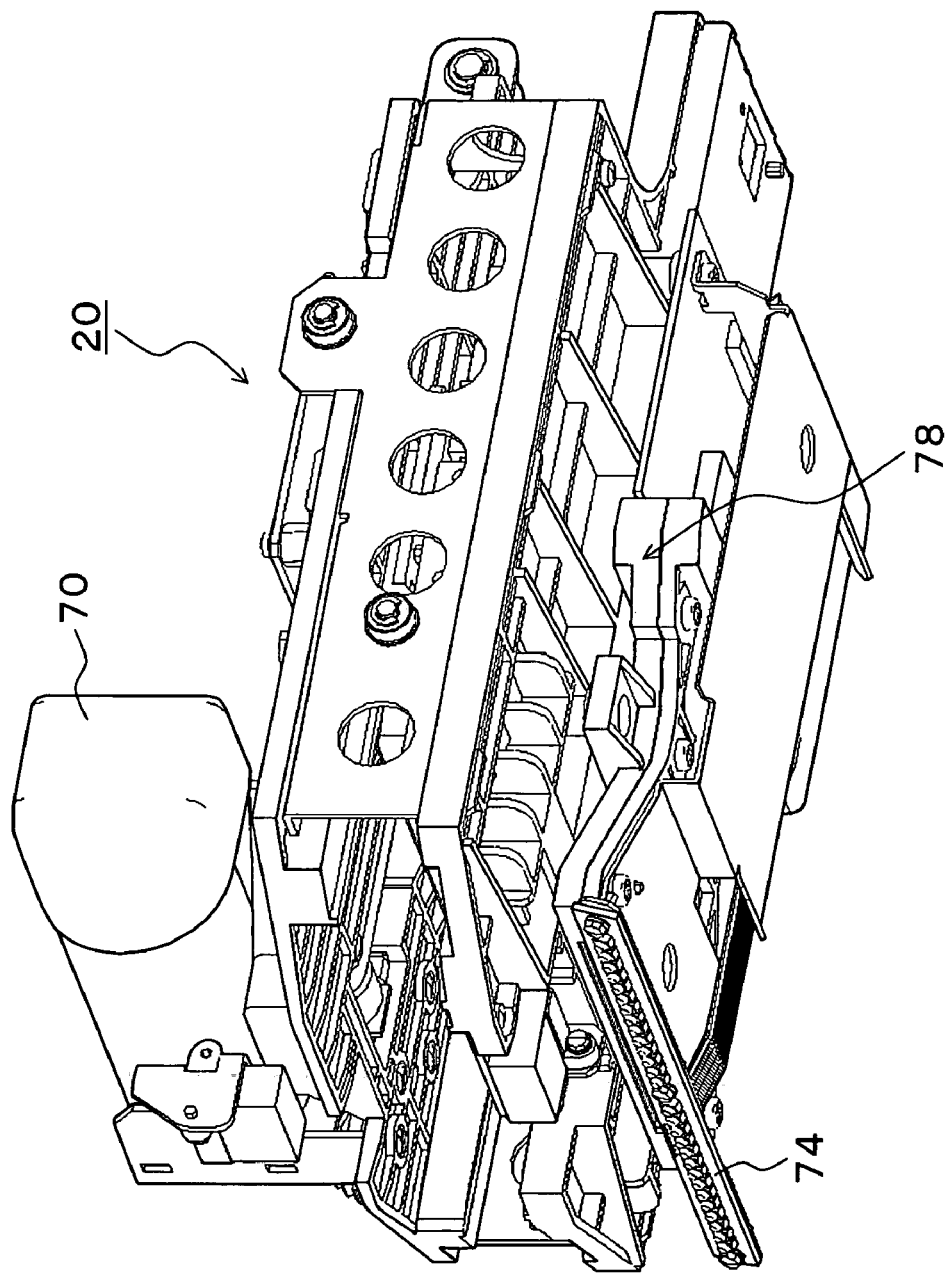
FIG. 7 is an explanatory view when

FIG. 6 is a figure of the only carrier robot 20 of FIG. 5. FIG. 7 is a figure of the state that FIG. 6 is looked from below. The carrier robot 20 is provided with a pair of hooking pawls 72-1 and 72-2 in the aperture under which the lighting LED unit 74 is disposed. The hooking pawls 72-1 and 72-2 move forward by the rotational control of the back and forth move motor for hooking 70, pinch the medium cartridge stored in the cartridge storage cabinet 24 and draw it into the robot. In FIG. 7 of the carrier robot 20 looked from below, an inside of a case behind the lighting LED unit 74 is as a barcode reader storage unit 78.

Figure 8:
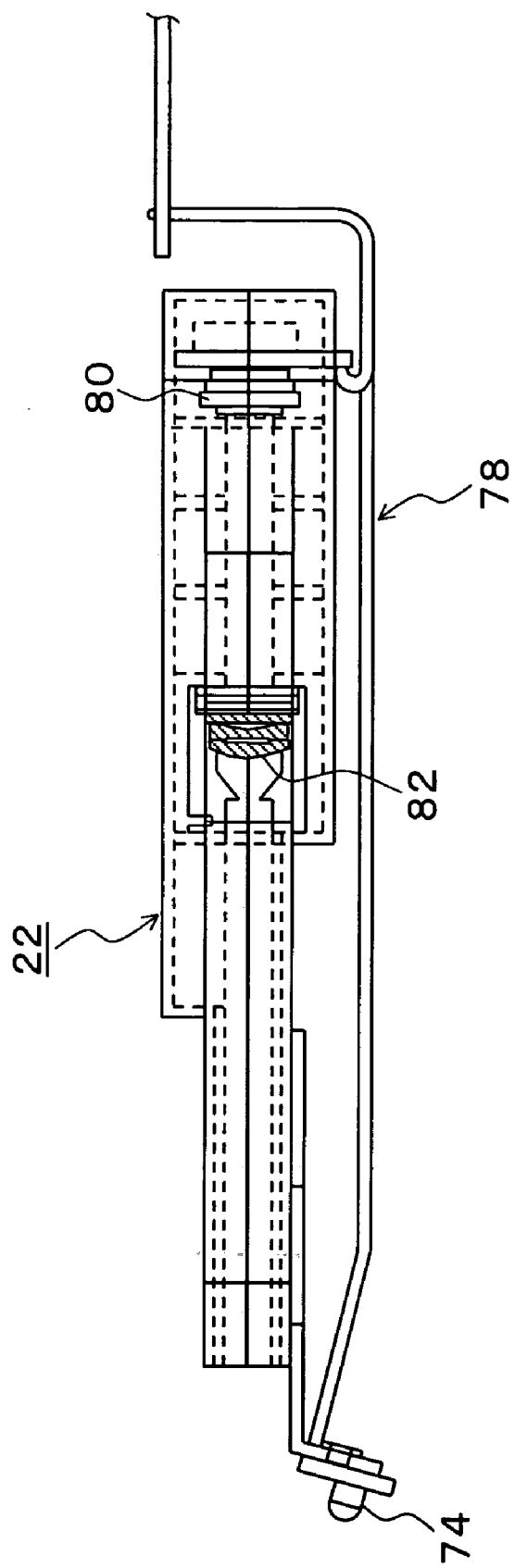
FIG. 8 is an explanatory view of barcode reader installed into the carrier robot.

FIG. 8 is an explanatory view of barcode reader 22 installed into the carrier robot 20. The barcode reader 22 is fitted into a barcode reader storage unit 78. A lighting LED unit 74 to illuminate the barcode label affixed on the back face of the medium cartridge is attached on the front edge of the barcode reader 22. A one-dimensional CCD 80 is provided inside the barcode reader 22 through a lens 82.

Figure 9:
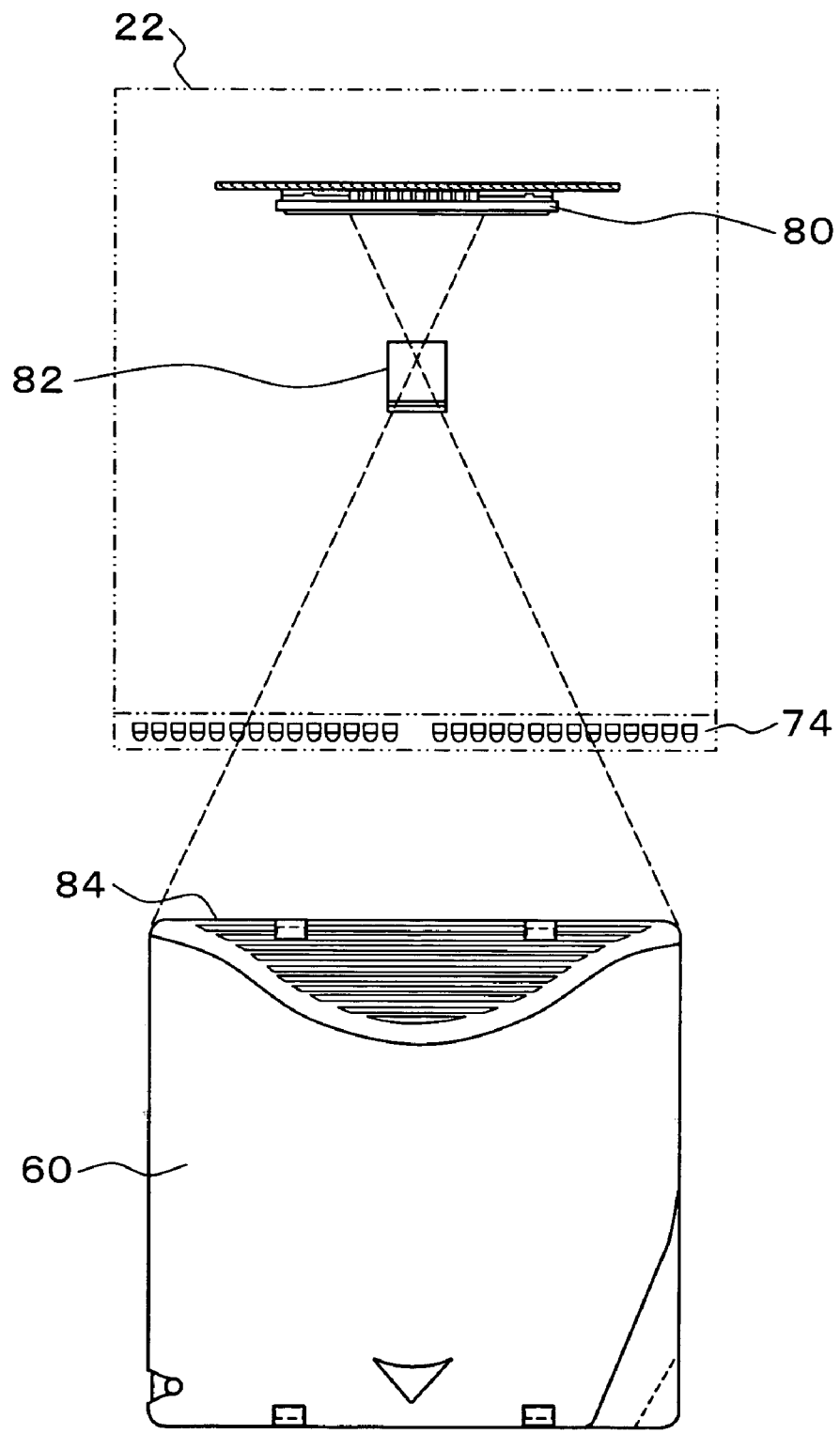
FIG. 9 is an explanatory view of the relation between the barcode reader and the medium cartridge in a plane.
Figure 10:
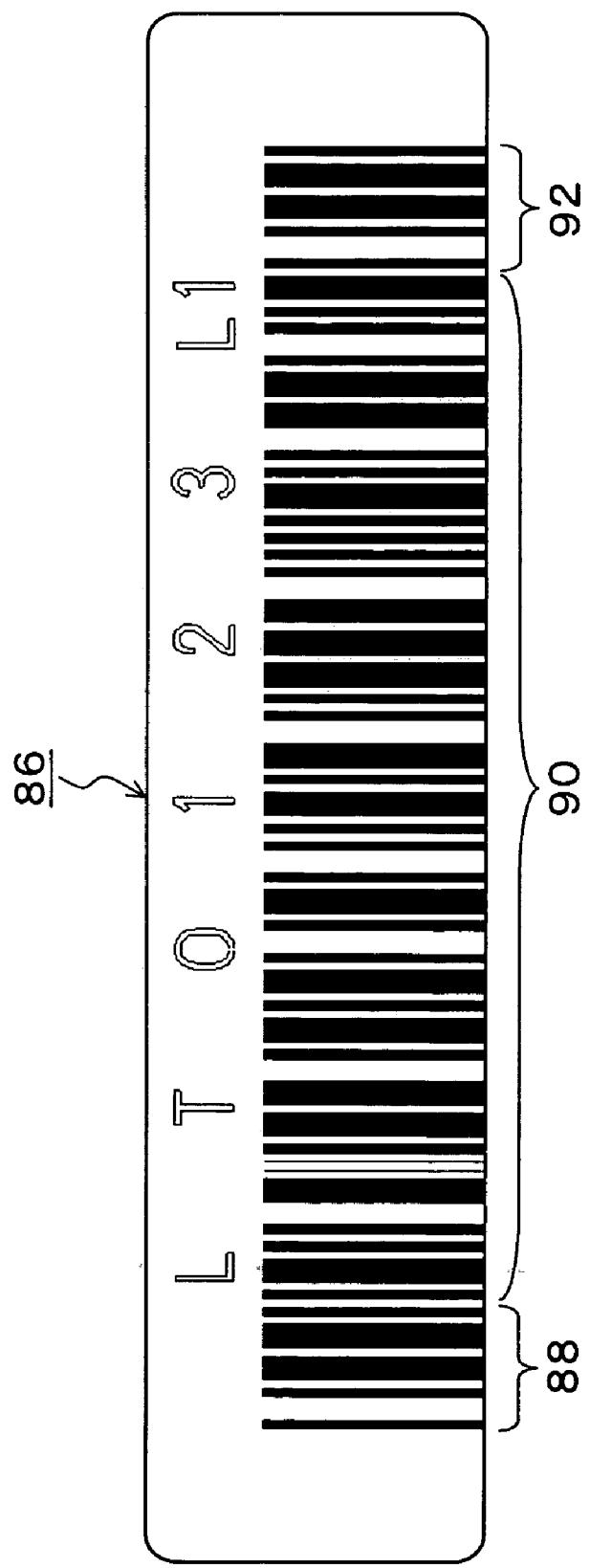
FIG. 10 is an explanatory view of the barcode label used for the present invention.

FIG. 9 is an explanatory view of the relation between the barcode reader 22 in FIG. 8 and the medium cartridge 60 in a plane. In FIG. 9, the medium cartridge 60 is stored in the cell of the cartridge storage cabinet 24. The back face portion of the medium cartridge protruding from the cell is as a label affixed surface 84. A barcode label 86 of FIG. 10 is affixed on the label affixed surface 84. The barcode reader 22 is positioned at the back of the medium cartridge 60 targeted for reading by the carrier robot 20 and reads by imaging the code label to the one-dimensional CCD 80 through the lens 82 and scanning it while the label affixed surface 84 is illuminated by the lighting LED unit 74. The one-dimensional CCD 80 is imaging devices in which CCD light receiving elements are arranged on the straight line, and has the sufficient resolution for the barcode.

The barcode label 86 of FIG. 10 is a barcode label used as the standard code in the library apparatus 10 of the present invention. The specification of the barcode label 86 uses such as CODE 39 system. In the barcode label 86, the left side portion is a start code 88, the right side portion is a stop code 92, and a barcode 90 for eight characters (one character=nine bit) is disposed therebetween.

Figure 11:
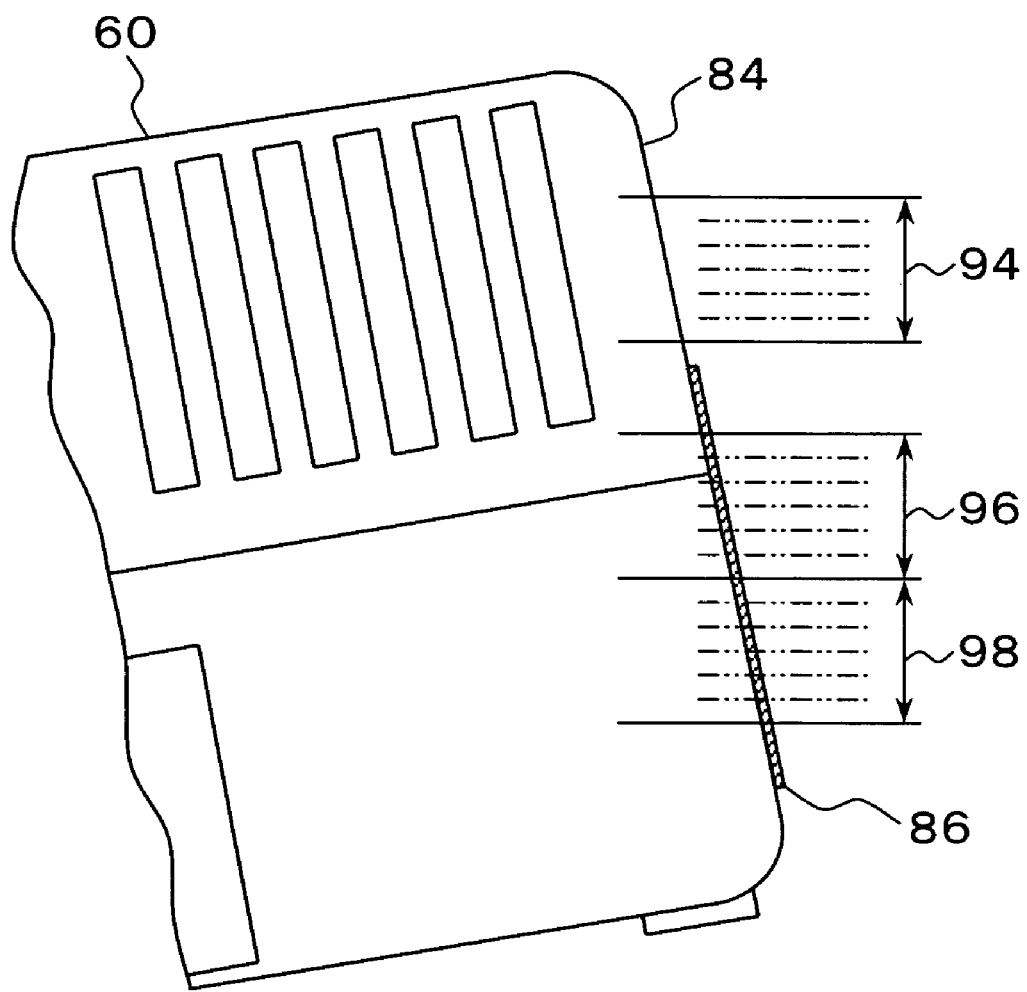
FIG. 11 is an explanatory view of the back surface of the cartridge affixed the barcode label.

FIG. 11 is an explanatory view of the back surface of the medium cartridge 60 affixed the barcode label 86 in FIG. 10 on the label affixed surface 84. When the barcode label 86 affixed on the label affixed surface 84 of the medium cartridge 60 is continuously read by the barcode reader 22 while the carrier robot is moved up or down in the inventory operation in the library apparatus of the present invention, the barcode label 86 is scanned three times upon the barcode reader passes to obtain the scanning data. If the decoding results of the scanning data for twice among the three times of continuously scanning for the barcode label 86 are matched, the decoding is successful. Alternatively, If the decoding results of the scanning data for twice among the three times of scanning are not matched, it is determined to be an error and a cause of error specification process will be executed. In the cause of error specification process, if it is determined to be no label, the determination result is notified the high-order device, alternatively, if the error is caused by other than no label, the retry operation is executed. When the retry operation is executed, the barcode reader 22 is moved to the medium cartridge 60 determined to be the error and the scanning is executed to retry. An upper region 94, a middle region 96 and a lower region 98 of the label affixed surface 84 are set as the scanning area for the cartridge 60 in the retry operation. Further, each region 94, 96 and 98 is subdivided into five scanning position as shown by the imaginary lines and scanned fifteen times as the maximum number of times in the retry operation. The scanning for the retry operation is the stop-scanning to read by exposing during the predetermined period while the barcode reader is fixedly positioned at the predetermined scanning position is executed. Additionally, the stop-scanning by positioning the barcode reader 22 at the medium determined to be the error is also applied to a barcode reader's failure diagnosis process for the error data.

Figure 12A:
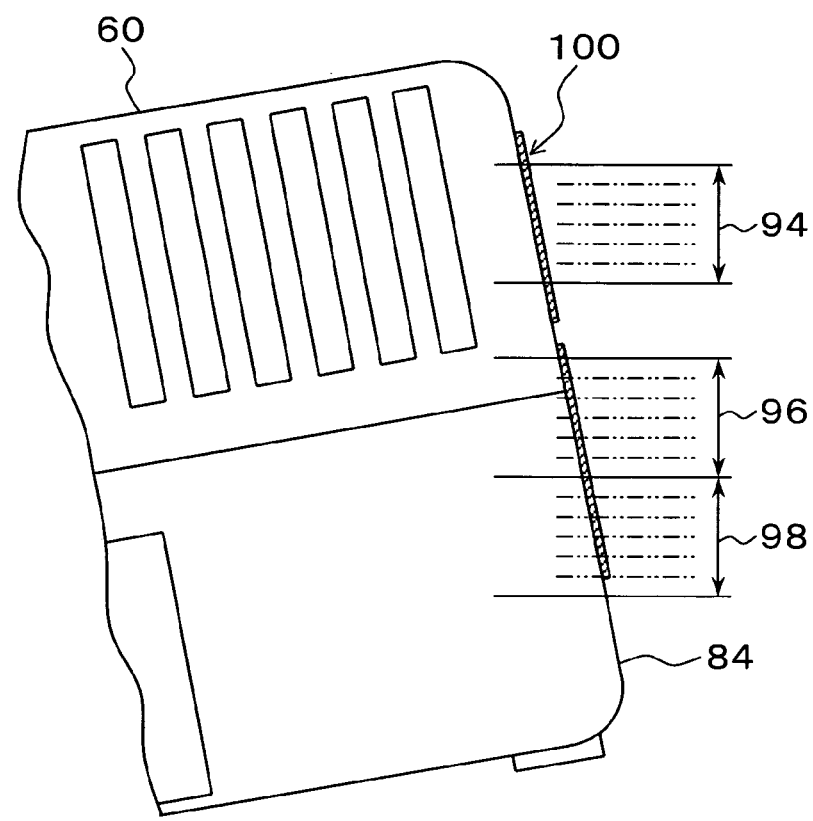
FIGS. 12A–12B is an explanatory view of the back surface of the cartridge affixed the barcode label which is not recommended by the apparatus's maker.
Figure 12B:
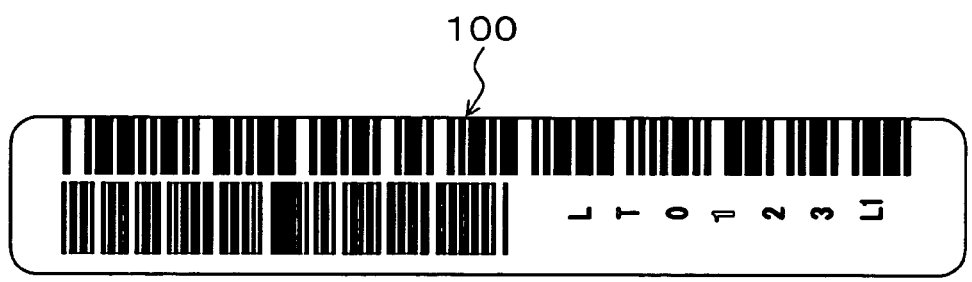

FIG. 12 is an explanatory view of the back surface of the cartridge affixed the barcode label which is not recommended by the apparatus's maker. FIG. 12A is a figure of the state that the non-recommendable barcode label 100 as the two-stage barcodes is affixed on the label affixed surface 84 of the medium cartridge 60. The non-recommendable barcode label 100 is a particular barcode label that such as the barcode of FIG. 12B which is constructed by two stages. If such non-recommendable barcode label 100 affixed on the medium cartridge 60 is inputted into the library apparatus, the scanning data of the non-recommendable barcode label 100 is not always an error in the inventory operation, however, the incidence of a retry is increased and it is targeted for the cause of error determination process.

Figure 13:
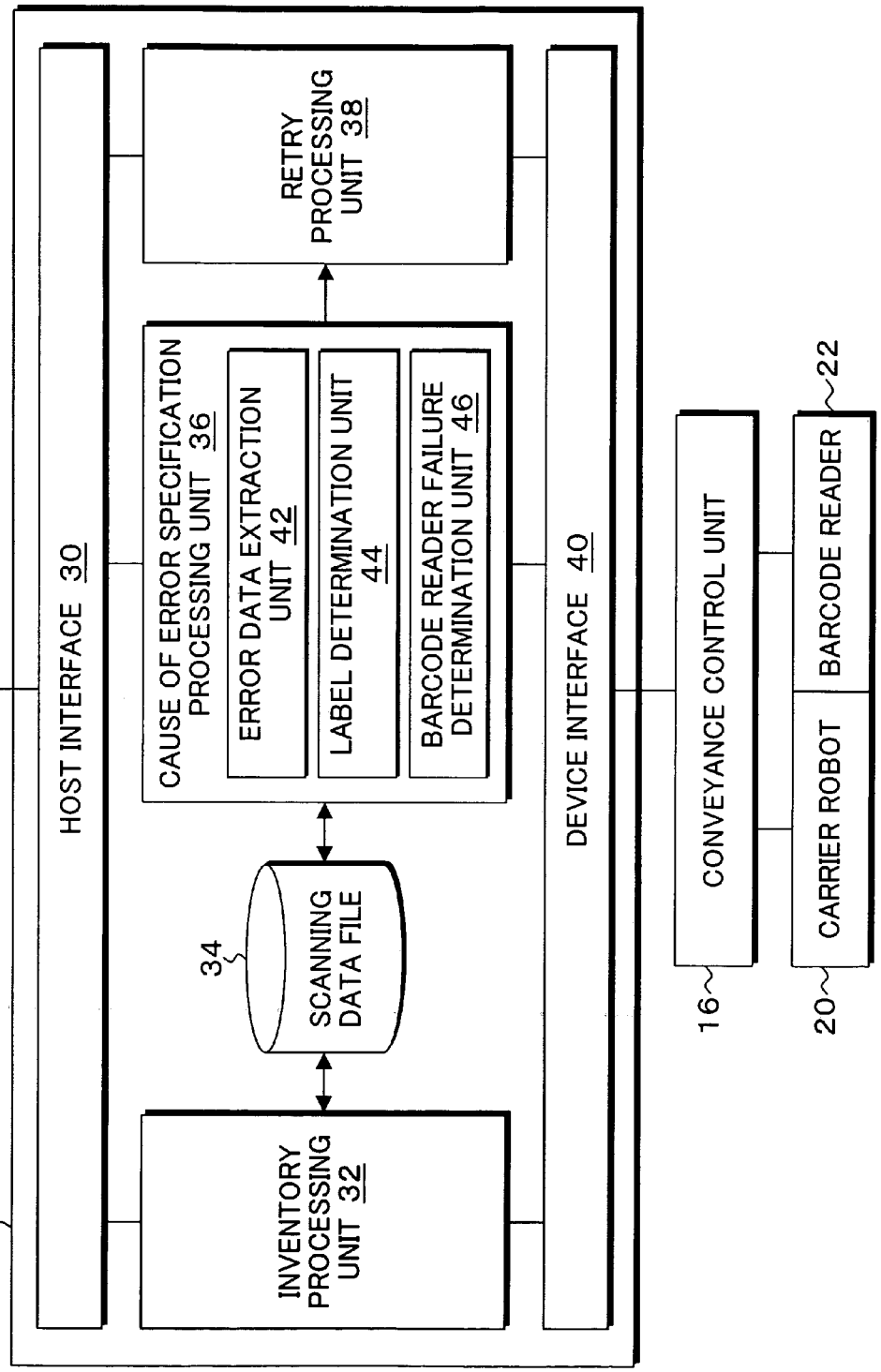
FIG. 13 is a block diagram of the functional configuration of the control processing according to the present invention, which is provided in the director of FIG. 1.

FIG. 13 is a block diagram of the functional configuration of the control processing according to the present invention, which is provided in the director 14-1 and 14-2 of FIG. 1 and the director 14-1 is taken as an example. In FIG. 13, the director 14-1 is provided with a host interface 30, an inventory processing unit 32, a scanning data file 34, a cause of error specification processing unit 36, a retry processing unit 38 and a device interface 40. Further an error data extraction unit 42, a label determination unit 44 and a barcode reader's failure determination unit 46 are provided as the functions of the cause of error specification processing unit 36. Such function of each block of the director 14-1 is achieved by executing the program of the computer which performs the director 14-1. The computer hardware including MPU, ROM and an interface of both of the host side and the device side is used as the director 14-1. The program which provides the control processing of the present invention stored in such as a ROM is executed thereby the function of each block in the director 14-1 of FIG. 13 is achieved. The inventory processing unit 32 provided in the director 14-1 reads by the barcode reader 22 the barcode label 86 affixed on the medium cartridge 60 by scanning per one label at least three times as the carrier robot 20 is moved in the cell array direction of the target column of the cartridge storage cabinet 24, i.e. moved from the top to bottom, and notifies the host of the successful reading if the decoding results between two times of scanning data are matched. The scanning data read in the inventory process by the inventory processing unit 32 is kept in the scanning data file 34 for the cause of error specification processing. The cause of error specification processing unit 36 extracts the error data from the scanning data of the scanning data file 34 obtained at the completion of process of the inventory processing unit, determines the presence or absence of the barcode label by analyzing the error data, and if it is determined that a barcode label exists, causes the retry processing unit 38 to execute a retry process, otherwise, reports the determination result as no label to the host without executing the retry process by the retry processing unit 38. The error data extraction unit 42 provided in the cause of error specification processing unit 36 extracts the error data from the scanning data file 34. Specifically, three times of scanning data are obtained per one barcode label. If the decoding result of two times among three times of scanning data are matched, the data is the normal data, alternatively, if each of the decoding result of three times of scanning data is not matched, the data is the error data. Such error data is extracted as the scanning data targeted for the cause of error determination processing. The label determination unit 44 determines that the cause of the error data extracted by the error data extraction unit 42 is whether no label or the other cause. The barcode reader's failure determination unit 46 operates when the failure of the barcode reader is tentatively determined in the process by the label determination unit 44 and executes the barcode reader's failure diagnosis process.

Where the determination process by the label determination unit 44 in the cause of error specification processing unit 36 is performed according to the following basic determination procedure:

(1) Check the other scanning data of the medium cartridge which occurs the error data and determine whether also a error data is occurred or not;
(2) If any one of the scanning for the medium cartridge is successful, determine to be the fouling of the barcode label and/or the abnormality of the scanning position and sift to the retry process;
(3) If all of the scanning results of the medium cartridge are the error, check the scanning result of the ahead and behind medium cartridges of the target medium cartridge, and if those are the error too, sift to the barcode reader's failure diagnosis process based on the assumption that the barcode 22 is at fault;
(4) If it does not meet the condition of (2) and (3), shift to the following label determination process based on the assumption that the barcode label does not exist;
(5) Determine whether the code specific to the barcode is contained or not in the error data.
(6) If the code specific to the barcode is contained in the error data, the following steps are executed in order to determine whether the code specific to the barcode is caused by a diffused reflection or the pattern of the medium cartridge,
   (a) retrieve the start code and the stop code; and
   (b) determine whether N/W ratio (N is thin element width and W is thick element width) according to the specification of the barcode is within the standard value or not.
If the determination reference (a) and (b) are satisfied, determine to be the fouling of the barcode label and shift to the retry process;
(7) If it does not meet the condition of (6), determine whether more than the threshold value of black pixels or white pixels sequence exists or not in the center of the error data. If more than the threshold value of black pixels or white pixels sequence exists, determine that the barcode label is not affixed on the medium cartridge, and notify of no label the high-order device; and
(8) If it does not meet the condition of (7), compare all of the error data of scanning for one medium cartridge, and determine whether the data array is similar or not. If it is not similar, determine that the barcode label affixed on the medium cartridge is as a handwriting label, otherwise, determine the barcode label affixed on the medium cartridge is as a below the standard label and notify of information of the abnormal label the high-order device.

Figure 14:
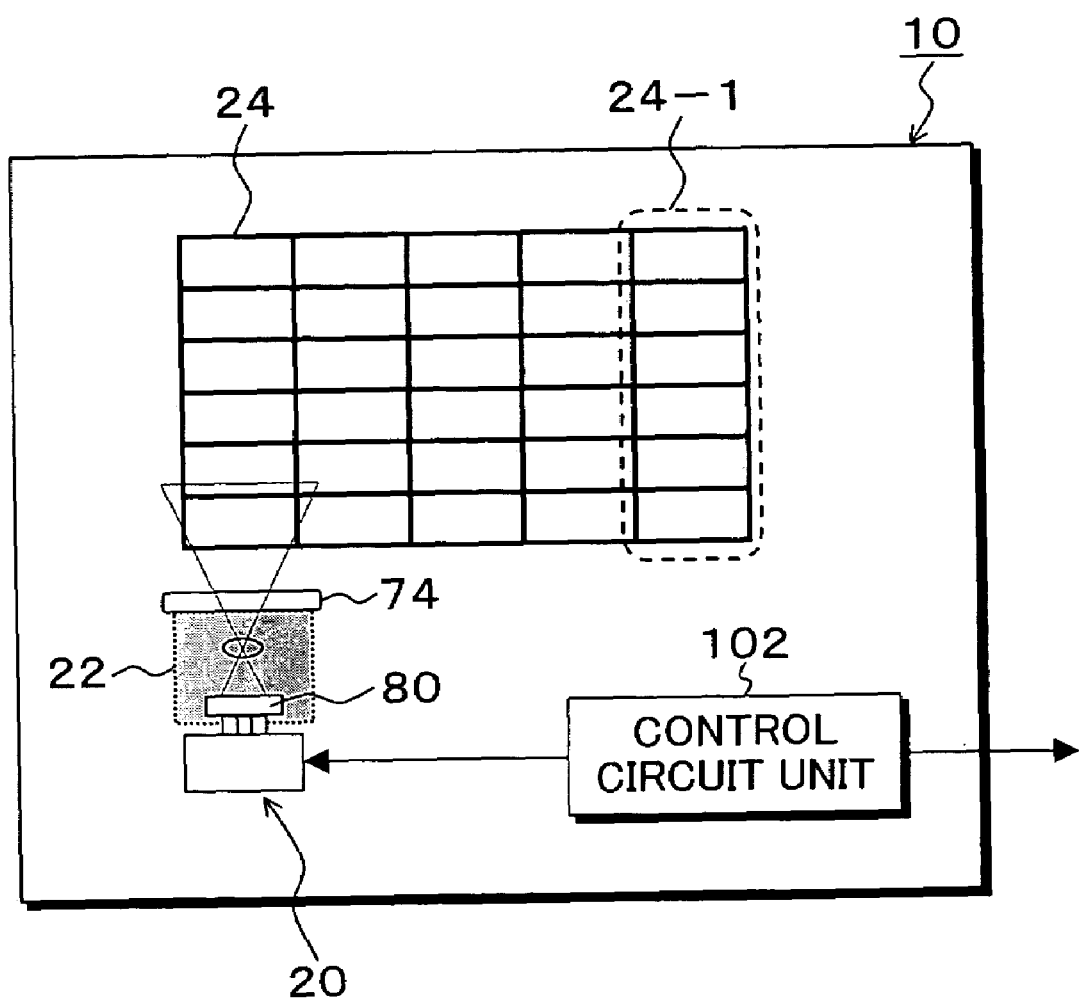
FIG. 14 is an explanatory view of the inventory process according to the present invention.

FIG. 14 is an explanatory view of the inventory process according to the present invention. In FIG. 14, in order to continuously read the barcode labels affixed on the medium cartridges stored in the cartridge storage cabinet 24 in the library apparatus 10, the carrier robot 20 is positioned at such as the top of the column 24-1 under the control of the control circuit 102, then the reading operation is performed as the barcode reader 22 is moved up or down at a regular speed by the carrier robot 20 while the lighting LED unit is turned on and scanning of the one-dimensional CCD 80 is activated. The director 14-1 and 14-2, and the conveyance control unit 16 of FIG. 1 are included in a control circuit 102.

Figure 15:
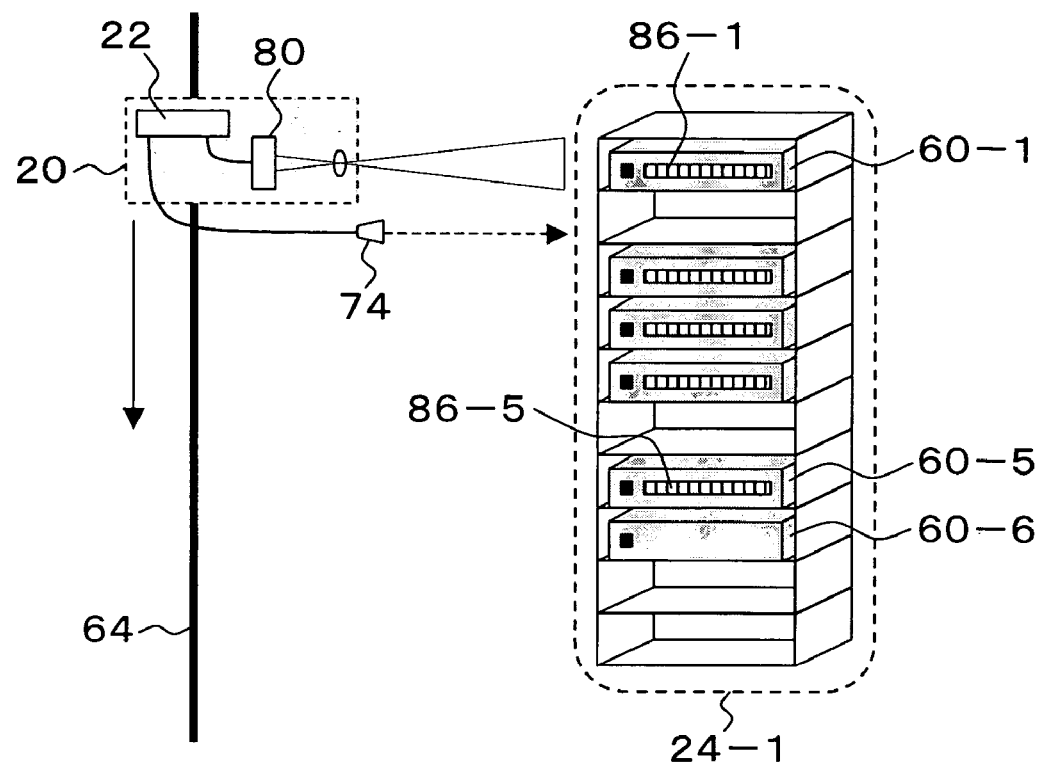
FIG. 15 is an explanatory view of the inventory process targeting the specified column.

FIG. 15 is an explanatory view of the inventory process targeting the specified column 24-1. The barcode reader 22 is positioned at a medium cartridge 60-1 stored in the top cell of the column 24-1 by the carrier robot 20 and reads by scanning of the one-dimensional CCD while the lighting LED 74 is turned on to illuminate the barcode label 86-1.

Figure 16A:
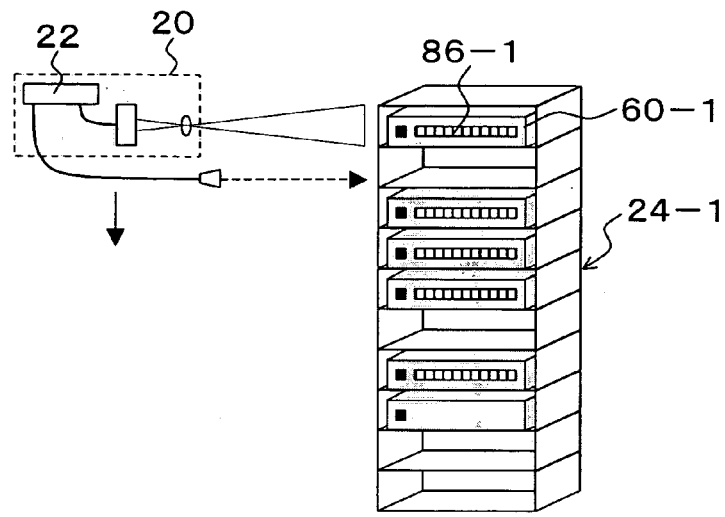
FIGS. 16A–16C is an explanatory view separately showing the procedure of the inventory process.
Figure 16B:
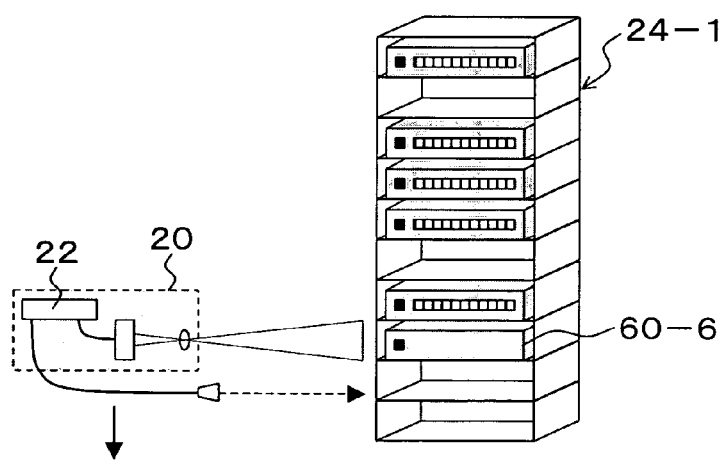
Figure 16C:
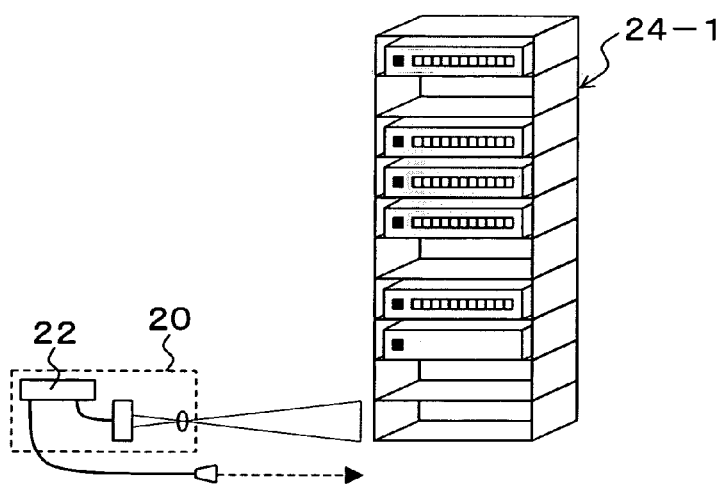

FIG. 16 is an explanatory view separately showing the procedure of the inventory process. That is to say, in FIG. 16A, the reading position of the barcode reader 22 is positioned at the barcode label 86-1 of the medium cartridge stored in the top cell of the column 24-1 and reads as the carrier robot 20 is moved downwardly at a regular speed. FIG. 16B is an explanatory view of the state that the barcode reader 22 reaches the medium cartridge which is not affixed the barcode label 60-6 and reads it. FIG. 16C is an explanatory view of the state that the barcode reader 22 moves the lowest storage cell of the column 24-1 and the inventory operation is completed.

Figure 17:
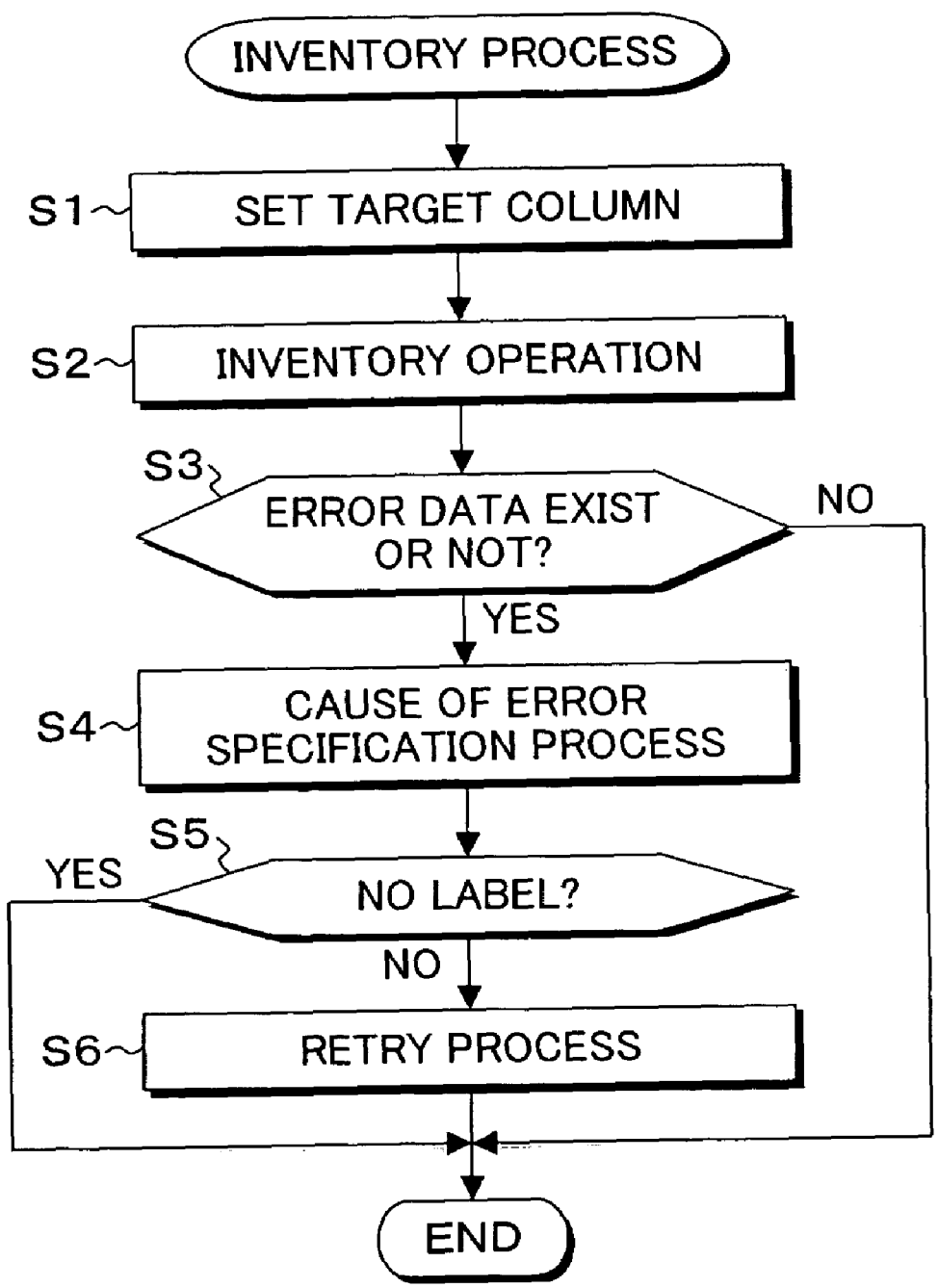
FIG. 17 is a flowchart of the inventory process according to the present invention.

FIG. 17 is a flowchart of the inventory process according to the present invention and the procedure is following:

Step S1: Set a certain column in the cartridge storage cabinet to the target column for the inventory process;
Step S2: Move the carrier robot 20 to the top of the target column and position the barcode reader 22 at the medium cartridge in the top storage cell, then execute to continuously read by the barcode reader as the carrier robot is moved downwardly at a regular speed (inventory operation);
Step S3: Determine whether any error data exists or not in the scanning data obtained at the completion of the inventory operation, and if the error data exists, advance to a step S4, otherwise, complete the process;

Step S4: Execute the error data specification process for the error data;

Step S5: If the specified result of the cause of error is no label, notify the host and complete the process, otherwise, advance to a step S6; and Step S6: Execute retry process for the error data determined that the label exists as a rule.

Figure 18:
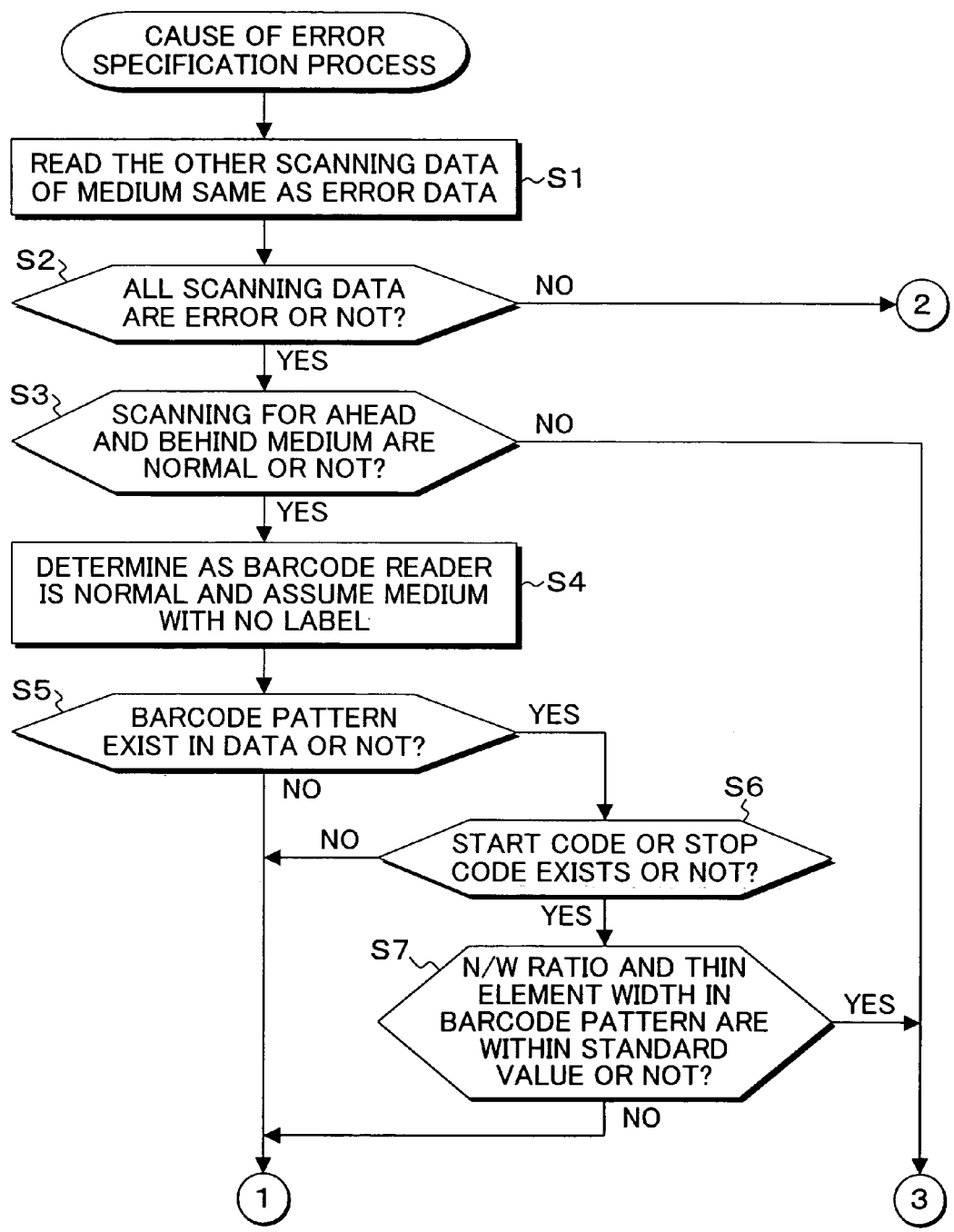
FIG. 18 is a flowchart of the cause of error specification process according to the present invention.
Figure 19:
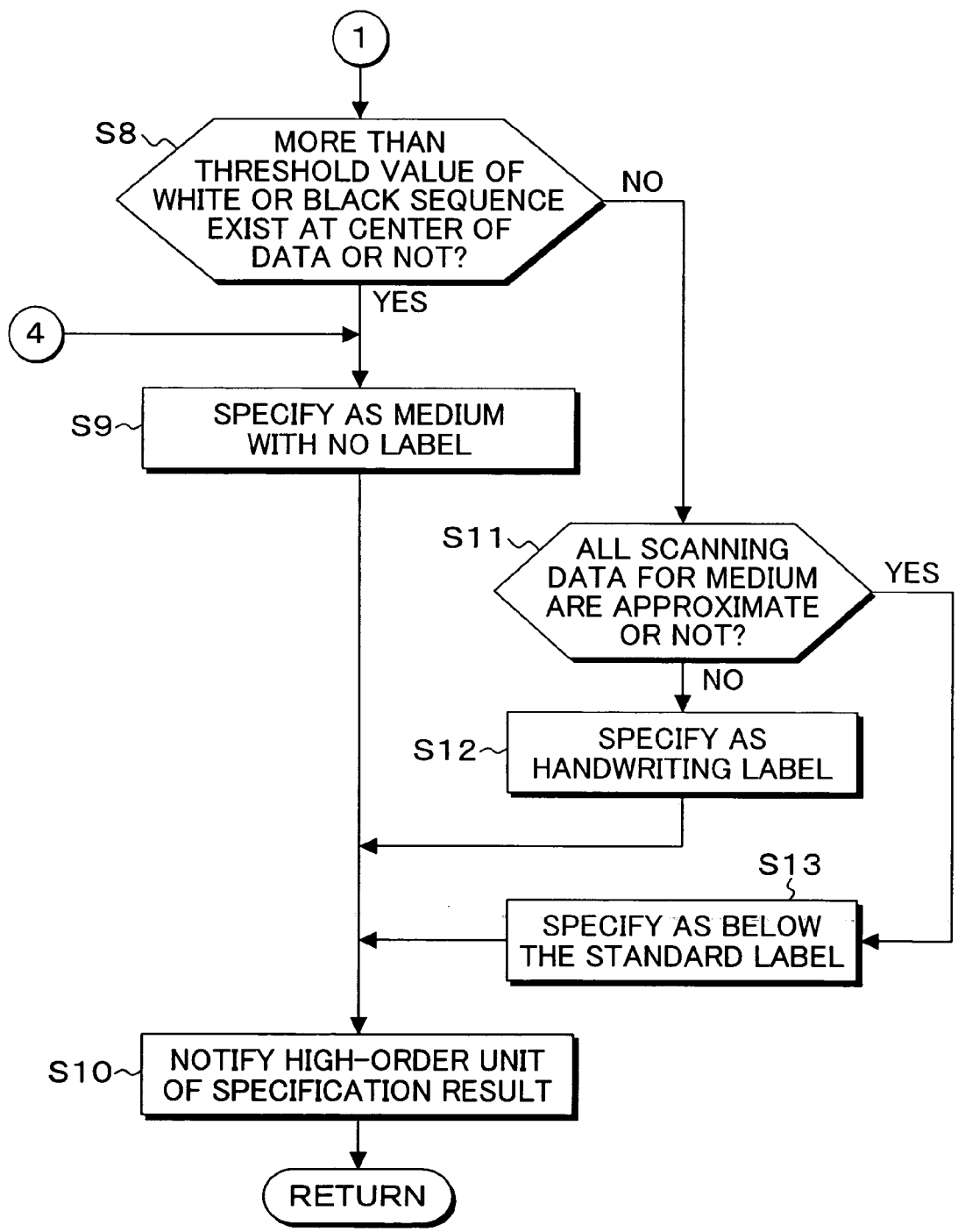
FIG. 19 is a flowchart of the failure determination process in the main for the barcode reader followed by FIG. 18.
Figure 20:
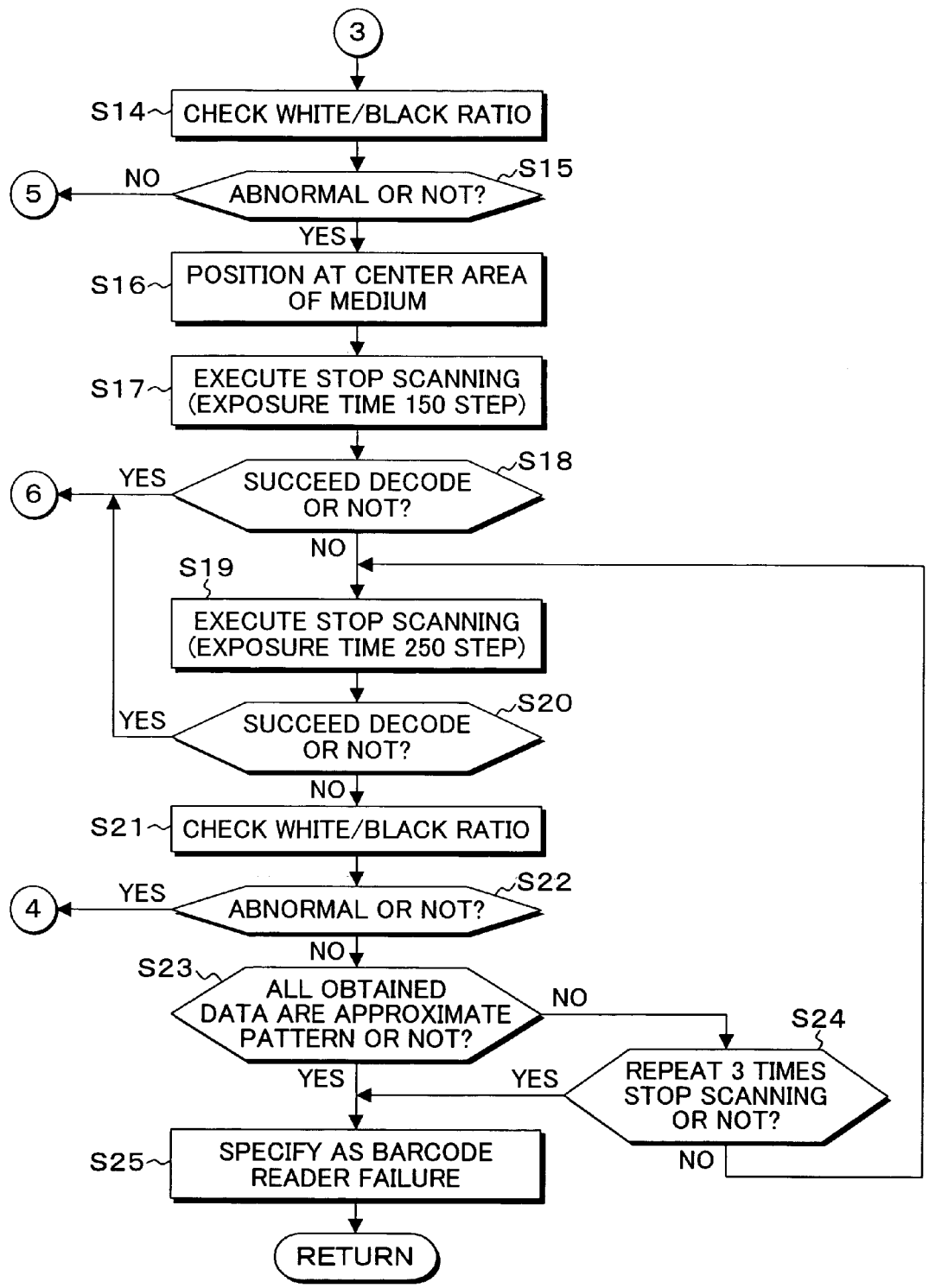
FIG. 20 is a flowchart followed by FIG. 19.
Figure 21:
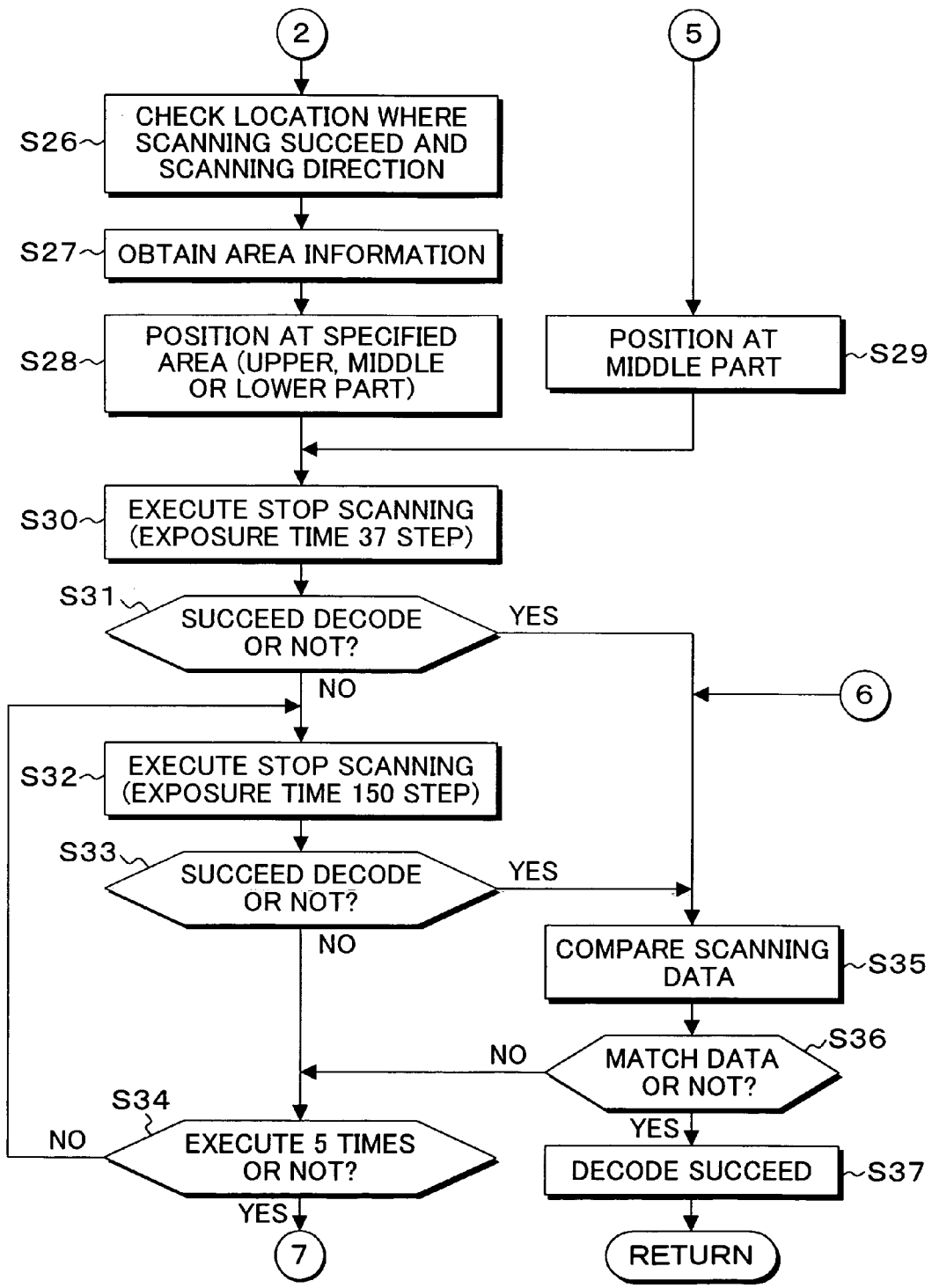
FIG. 21 is a flowchart of the retry process followed by FIG. 20.
Figure 22:
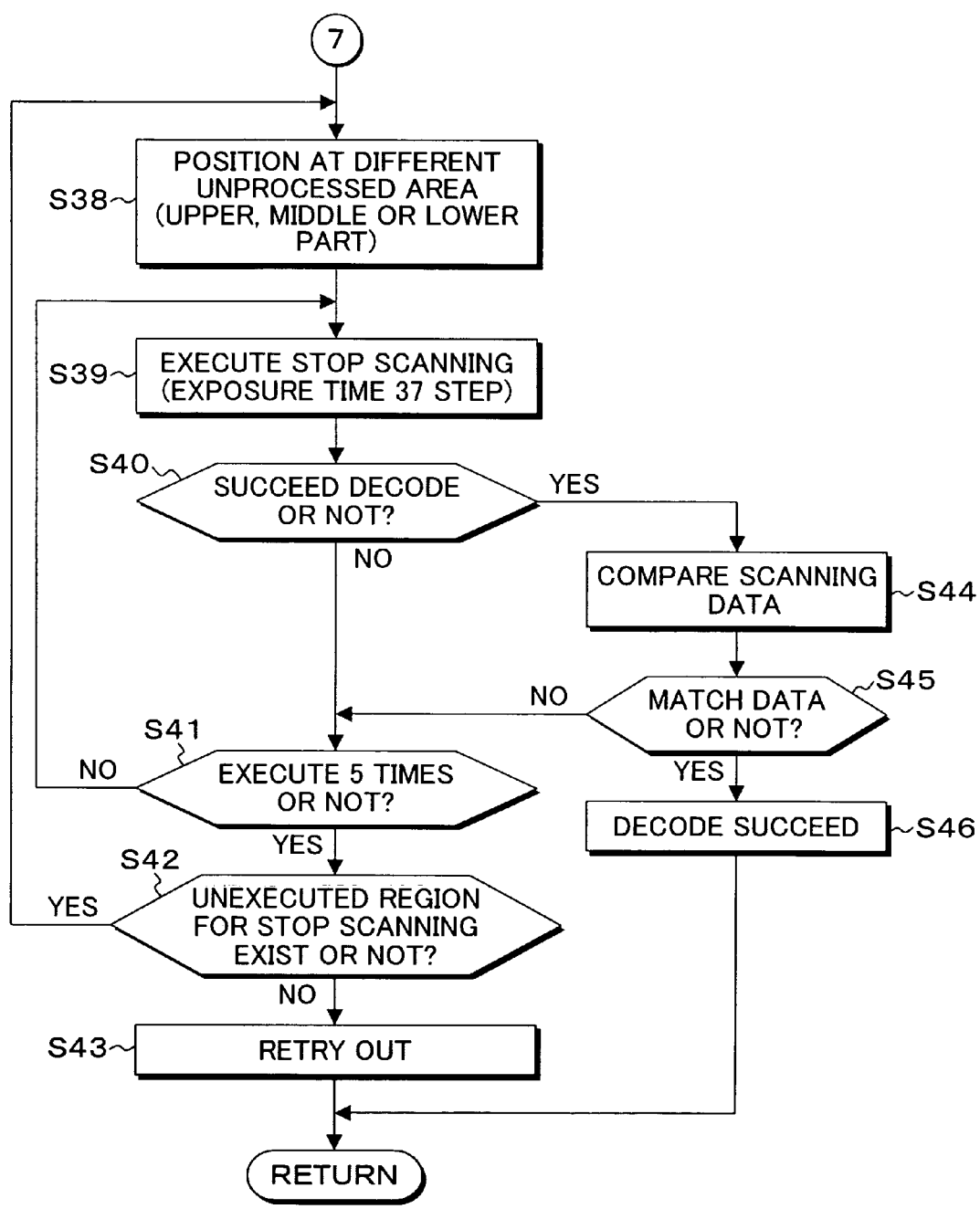
FIG. 22 is a flowchart of the retry process followed by FIG. 21.
Figure 23:
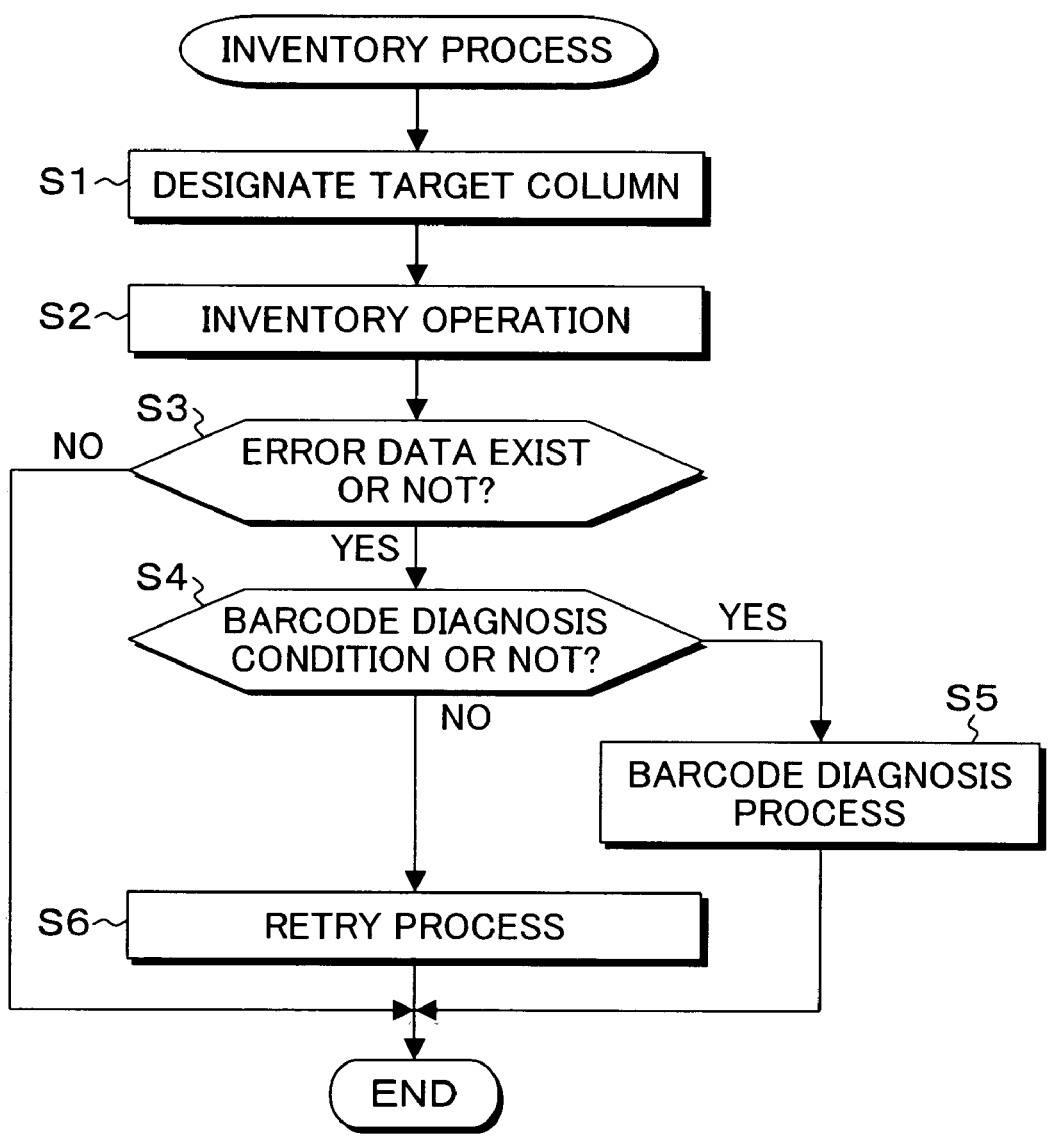
FIG. 23 is a flowchart of the conventional inventory process.

FIG. 18, FIG. 19, FIG. 20, FIG. 21 and FIG. 22 are flowcharts representing the cause of error specification process and the retry process of the step S4–S7 of FIG. 17 in detail. The procedure of the flowcharts has the content of the program for the inventory process according to the present invention. FIG. 18 is a flowchart of the cause of error specification process to determine to be no label. Subsequently, the flowcharts of FIG. 19 and FIG. 20 are mainly the procedure of barcode reader's failure determination process. The flowcharts of FIG. 21 and FIG. 22 are mainly the procedure of the retry process.

Firstly, the procedure of the flowchart for the cause of error specification process to determined whether the presence or absence of the barcode label of FIG. 18 is described as follows:

Step S1: Read the other scanning data in the same medium as the error data extracted as processing target. Three scanning data including the error data are read according to the present invention;

Step S2: determine whether all of the scanning data are the error data or not, and if the all of the scanning data are the error data, advance to a step S3, otherwise, advance to a step S26 in the retry process of FIG. 20;

Step S3: Determine whether the scanning data of the ahead and mediums of the medium determined that all scanning data are the error data are normal or not. If the data are normal, advance to a step S4, otherwise, advance to a step S14 in the barcode reader's failure diagnosis process of FIG. 20 based on the assumption that the barcode reader is at fault;

Step S4: Since the scanning of the ahead and behind medium of the medium determined that all of the scanning data are the error data is normal, determine that the barcode reader is not at fault and shift to the label determination process including the following step S5–step S13 based on the assumption that the medium is no label;

Step S5: Firstly, determine whether any barcode pattern exists or not in the error data. If the barcode pattern exists, advance to a step S6, otherwise, advance to a step S8 of FIG. 19;

Step S6: Determine whether the start code or the stop code exists or not in the barcode pattern. If at least either start code or stop code exists, advance to a step S7, otherwise, advance to a step S8. The determination is based on whether the barcode pattern of the error data is caused by a diffused reflection or the pattern of the medium;

Step S7: Determine whether the N/W ratio and the thin element width are within the standard value, respectively or not. If the N/W ratio and the thin element are out of the standard value, advance to a step S8 of FIG. 19, otherwise, advance to a step S14 of FIG. 20 in the barcode reader's failure diagnosis process based on the assumption that the barcode reader 22 is at fault. The determination is based on a fouling of the barcode;

Step 8: Determine whether more than the threshold value of white pixels or black pixels sequence exists or not in the center of the error data. If more than the threshold value of white pixels or black pixels sequence exists, advance to a step S9, otherwise, advance to a step S11;

Step 9: Since more than the threshold value of white pixels or black pixels sequence does not exist in the center of the error data, determine that the medium is no label;

Step 10: Notify the host of the cause of error specification result including the specification result of the medium with no label;

Step 11: In case of more than the threshold value of white pixels or black pixels sequence does not exist in the center of the error data, determine whether all of the three scanning data for the medium are similar or not. If all of the three scanning data are similar, advance to a step S12, otherwise, advance to a step S13;

Step S12: Since the all of the scanning data are not similar, specify that it is a handwriting label and advance to the step S10 and notify of the specified result the high-order device; and Step S13: Since the all of the scanning data are similar, specify that it is a below the standard barcode label 100 as FIG. 12B for example. Advance to the step S10 and notify of the specified result the host.

As thus described above, if the error data is analyzed in the step S1–S10 of FIG. 18 and FIG. 19 and it is determined to be no barcode label, the determination result of no label is notified the host and the process can be completed without executing the retry process required the stop-scanning fifteen times at the maximum.

Next, the procedure of the barcode reader's failure diagnosis process in the main is described with reference to the flowchart of FIG. 20. The procedure of the barcode reader's failure diagnosis process in the main is as the following a step S14–S25:

Step S14: It is the case that all of the scanning data for one medium are the error data in the step S2 or the N/W ratio and the thin element width of the barcode pattern are within the standard value in the step S7 of FIG. 18, check the white/black ratio of the error data;

Step S15: If the white/black ratio is not normal, advance to a step S16, otherwise, advance to a step S29 in the retry process of FIG. 21;

Step S16: If the white/black ratio is not normal, position the barcode reader 22 at a center area 96 of the medium cartridge 60 of FIG. 11 by the carrier robot 20;

Step S17: Expose during the certain exposing period such as 150 steps (1 step is a run unit of the program), then perform the stop-scanning to output the accumulation result of the one-dimensional CCD while the barcode reader 22 is positioned at the center area of the medium cartridge;

Step S18: Determine whether the decoding of the scanning data with the stop-scanning data is successful or not, and if it is successful, advance to a step S35 in the retry process of FIG. 21, otherwise, advance to a step S19;

Step S19: Perform the stop-scanning by the exposure time 250 steps of the barcode reader at the same position as the step S16. In this case the exposure time is longer than that of the step S17 by 100 steps;

Step S20: Check whether the decoding is successful or not for the scanning data by the stop-scanning with the exposure time 250 steps, and if the decoding is successful, advance to a step S35 in the retry process of FIG. 21, otherwise, advance to a step S21;

Step S21: Check the white/black ratio based on the scanning data by the stop-scanning of the step S19;

Step S22: If the white/black ratio is not normal, advance to the step S9 of the FIG. 19. In this case, specify also the medium with no barcode label and notify the host. If the white/black ratio is normal, advance to a step S23;

Step S23: Determine whether all of the scanning data obtained by the stop-scanning are similar pattern or not, and if all of the scanning data obtained from the stop-scanning are not similar pattern, advance to a step S24, otherwise, advance to a step S25;

Step S24: Determine whether the stop-scanning is repeated three times when all of the scanning data are not similar pattern, and if the stop-scanning is not repeated three times, return to the step S19, otherwise, advance to a step S25; and Step S25: Since all of the data obtained from the three times of stop-scanning are similar pattern, specify that the barcode reader 22 is at fault and notify the host.

As thus described above, in the process of the step S14–S25, the diagnosis process is executed based on the assumption that the barcode reader 22 is at fault and the failure of the barcode reader is specified. In the other case, it is determined to be none of duplication and shift to the retry process.

Next, the procedure the retry process in the main is described with reference to the flowcharts of FIG. 21 and FIG. 22. In the retry process, each of the upper region 94, the middle region 96 and the lower region 98 of the label affixed surface 80 of the barcode label 86 is subdivided into five regions, respectively, in shot, 15 regions of FIG. 11 so that the scanning is performed maximum 15 times for the cartridge determined to be the error. FIG. 21 is a flowchart of the first stop-scanning at the maximum five times among the three regions. FIG. 22 is a flowchart of each stop-scanning at the maximum five times of the remaining two regions in the retry process. Now the procedure of the retry process for the first one of FIG. 21 is as the following S26–S37:

Step S26: It is the case that any of the three times of the scanning of one medium becomes the error in the step S2 of FIG. 18. In this case, check the scanning location and the direction where the scanning data is normal;

Step S27: Obtain area information including the location where the scanning is successful in the medium cartridge;

Step S28: Move the barcode reader 22 by the carrier robot 20 to the upper, middle or lower region specified in the step S27 and position it at beginning position of the five scanning location in the specified region;

Step S29: It is the case that the white/black ratio is not normal when the white/black ratio is checked be based on the assumption that the barcode reader 22 is at fault in the step S15 of FIG. 20. In this case, position the barcode reader 22 by the carrier robot 20 at the beginning position of the five places of the middle region 96 in the cartridge 60 to be targeted;

Step S30: Execute the stop-scanning of the exposure time 37 steps;

Step S31: Determine whether the decoding of the scanning data by the stop-scanning is successful or not, and if the decoding is successful, advance to a step S35, otherwise, advance to a step S32;

Step S32: Execute the stop-scanning of the exposure time 150 steps;

Step S33: If the decoding is successful, advance to a step S35, otherwise, advance to a step S34;

Step S34: Check whether the stop-scanning is executed five times, and if it is not executed five times, return to the step S30, and move to the next scanning position to execute the stop-scanning, otherwise, advance to a step 38 of FIG. 22;

Step S35: It is the case that the decoding by the stop-scanning is successful in any of the step S31, the step S33 and step S18 of FIG. 20 or step S20, in this case, compare the scanning data;

Step S36: If the compared scanning data is matched, advance to a step S37, otherwise, advance to the step S34; and Step S37: Determine that the scanning by the retry process is successful, notify of the decoding result the host and complete the process.

Next, the retry process for the remaining two regions of the medium cartridge targeted for the retry of FIG. 22 is as the following S38–S46:

Step S38: Position the barcode reader at the beginning position of the unprocessed region other than the processed region, i.e. any one of the remaining upper, middle or lower region of FIG. 21;

Step S39: Execute the stop-scanning of the exposure time 37 steps;

Step S40: If the decoding is successful, advance to a step 44, otherwise, advance to a step 41

Step S41: Check whether the stop-scanning is executed five times or not and if the stop-scanning is not executed five times, return to the step 39, otherwise, advance to a step 42;

Step S42: Check whether any region where the stop-scanning is not executed exists or not and if the region where the stop-scanning is not executed exists, return to the step S38, otherwise, advance to a step 43;

Step S43: Since even if all of the stop-scanning fifteen times are executed, the decoding is not successful, Determine to be retry out and notify the host of the inability of the decoding.

Step S44: It is the case that the decoding by the stop-scanning is successful in the step S39. Compare the scanning data;

Step S45: If the scanning data are matched, advance to a step S46, otherwise, advance to the step 41; and Step S46: Determine the retry process by the stop-scanning is successful, notify the high-order device of the result and complete the process.

As evidenced by the retry process of the flowchart of FIG. 21 and FIG. 22, if it is not determined to be no label in FIG. 18 and FIG. 19, and also if it is not determined that the barcode reader is at fault in FIG. 20, the stop-scanning is executed at the maximum fifteen times in the retry process of FIG. 21 and FIG. 22, the decode is not successful and the retry process is retry out. If the cause of error specification process regarding no barcode label in FIG. 18 and FIG. 19 is not executed as usual, the retry process by the stops scanning fifteen times executed for all of the cartridge medium to be no label in FIG. 21 and FIG. 22, and the retry process is retry out so that it takes significantly long time to process. Alternatively, in the present invention, since the retry process for such medium with no label is not required so that when an error data is generated in the inventory process, the processing time is shortened thereby the process performance can be improved.

The present invention includes appropriate modifications without departing from the object or advantage and is not limited to numeric numbers indicated in the above embodiment. Especially, regarding the hardware configuration of FIG. 1 and the apparatus configurations of FIG. 3–FIG. 7, provided that any library apparatus comprises a medium storage to store medium cartridges affixed barcode labels by handling unit, a plurality of recording/reproducing device to record and reproduce the medium cartridges, a medium conveyor as a carrier robot to convey the medium between the medium storage and the recording/reproducing device based on the move command from a host, and a barcode reader to optically read the barcode label of the medium cartridge carried on the medium conveyor by line scanning with one-dimensional imaging pixels may be applied.

As thus described above, according to the present invention, if in the inventory operation to check the type of the medium stored in the apparatus, the recording medium which is not affixed a barcode label is scanned, the error data is extracted from the scanning data of the barcode labels obtained by the inventory operation, the cause of error specification process is executed so that it is determined to be no label. Thereby if it is no label, that matter is notified the high-order device and the process can be completed without shifting the retry process. Therefor, the unnecessary retry process for the cartridge with no label is not executed and useless operation for the error data caused by the medium with no label is eliminated so that the time for the inventory operation is shortened thereby the process performance can be improved.

Further, a handwriting label, a below the standard label and also the failure of the barcode reader are specified as the error data all together through the no label determination process thereby the error data generated in the inventory operation can be appropriately handled.

The invention claimed is:

1. A library apparatus comprising:
a medium storage having a plurality of storage cells for storing reading medium affixed barcode labels;
a recording/reproducing device for either recording or reproducing information using the reading medium;
a medium conveyor for conveying the reading medium between the medium storage and the recording/reproducing device; and
a reader for reading optically the barcode labels of the reading medium carried on the medium conveyor by line scanning with one-dimensional imaging pixels,
wherein the library apparatus further comprising:
an inventory processing unit for reading by the reader the barcode labels of the recording medium by scanning a plurality times per one label as moving the medium conveyor and notifying of stored medium information; and
a cause of error specification processing unit for determining the presence or absence of the barcode label by extracting an error data from a reading result obtained by the inventory processing unit, executing a predetermined retry process if a barcode label exists and reporting a determination result without executing the retry process if a barcode label does not exist.

2. The library apparatus according to claim 1, wherein the cause of error specification processing unit causes a label determination processing unit to execute a determination process based on the assumption that a barcode label does not exist if all of the plurality of scanning data for one recording medium are error data and the reading results of the ahead and behind recording medium are normal.

3. The library apparatus according to claim 2, wherein the label determination processing unit determines whether a barcode pattern exists or not in the scanning data determined to be an error and if the barcode pattern does not exist, a determination is made to be no label provided that more than a threshold value of black pixels or white pixels sequence exists at the center of data.

4. The library apparatus according to claim 2, wherein the cause of error specification processing unit causes a reader's failure determination processing unit to execute a determination process based on the assumption that the reader is at fault if all of the plurality of scanning data for the barcode label are the error data and the reading result of the ahead and behind recording medium are not normal.

5. The method for controlling the library apparatus according to claim 4, wherein the reader's failure determination processing unit determines a white/black ratio of the scanning data, executes a stop-scanning to read by exposing during a predetermined period while the reader is moved by the medium conveyor to the recording medium scanned the error data and fixedly positioned if the white/black ratio is not normal, repeats the stop-scanning a predetermined times if the scanning is failed and the white/black ratio is normal, and determines that the reader is at fault if all of the plurality of scanning data are similar.

6. The library apparatus according to claim 5, wherein the reader's failure determination unit determines to be no label if the stop-scanning is failed and the white/black ratio is not normal.

7. The library apparatus according to claim 3, wherein the label determination processing unit determines the presence or absence of a start code or a stop code if the barcode pattern exists in the scanning data determined to be an error, and determines to be no label provided that more than the threshold value of black pixels or white pixels sequence exists at the center of data if neither the start code nor the stop code exists.

8. The library apparatus according to claim 3, wherein the label determination processing unit determines whether a N/W ratio and a thin element width are within a standard value if at least either start code or stop code exists in the scanning data determined to be an error, and determines to be no label provided that more than a threshold value of black pixels or white pixels sequence exists at the center of data if the N/W ratio and the thin element width are within a standard value.

9. The library apparatus according to any one of claims 3 to 8, wherein the label determination processing unit determines whether a plurality of scanning data read from the same recording medium are similar or not if more than a threshold value of black pixels or white pixels sequence does not exist, and determines to be a below the standard label if the plurality of scanning data are similar, otherwise, determines to be a handwriting label.

10. The library apparatus according to claim 1, wherein in a retry process by the cause of error specification processing unit, the stop-scanning to read by exposing during the predetermined period such that the scanning frequency within a predetermined reading range becomes the multiple of the scanning frequency of the inventory processing unit while the reader is moved by the medium conveyor to the recording medium scanned the error data and fixedly positioned, is executed.

11. The library apparatus according to claim 10, wherein in the retry process by the cause of error specification processing unit, the reading range of the reading medium is divided into an upper region, a middle region and a lower region, and the stop-scanning for each region is executed at least five times every predetermined moving pitch.

12. A computer-readable storage medium which stores a computer implemented-program of a library apparatus comprising a medium storage having a plurality of storage cells for storing reading medium affixed barcode labels, a recording/reproducing device for either recording or reproducing information using the reading medium, a medium conveyor for conveying the reading medium between the medium storage and the recording/reproducing device, and a reader for reading optically the barcode labels of the reading medium carried on the medium conveyor by line scanning with one-dimensional imaging pixels, the computer implemented program of the library apparatus for performing, comprising the steps of:

an inventory processing step for reading by the reader barcode labels of the recording medium by scanning a plurality of times per one label as moving the medium conveyor and notifying of stored medium information; and a cause of error specification processing step for determining the presence or absence of the barcode label by extracting the error data from the reading result obtained by the inventory processing step, executing a predetermined retry process step if a barcode label exists and reporting a determination result without executing the retry process step if a barcode label does not exist.

13. The storage medium according to claim 12, wherein the cause of error specification processing step causes a label determination processing step to execute a determination process based on the assumption that a barcode label does not exist if all of the plurality of scanning data for one recording medium are error data and the reading results of the ahead and behind recording medium are normal.

14. The storage medium according to claim 13, wherein the label determination processing step determines whether a barcode pattern exists or not in the scanning data determined to be an error and if the barcode pattern does not exist, a determination is made to be no label provided that more than a threshold value of black pixels or white pixels sequence exists at the center of data.

15. The storage medium according to claim 14, wherein the label determination processing step determines the presence or absence of a start code or a stop code if the barcode pattern exists in the scanning data determined to be an error, and determines to be no label provided that more than a threshold value of black pixels or white pixels sequence exists at the center of data if neither the start code nor the stop code exists.

16. The storage medium according to claim 14, wherein the label determination processing step determines whether a N/W ratio and a thin element width are within a standard value if at least either start code or stop code exists in the scanning data determined to be an error, determines to be no label provided that more than a threshold value of black pixels or white pixels sequence exists at the center of data if the N/W ratio and the thin element width are within a standard value.

17. A method for controlling a library apparatus comprising a medium storage having a plurality of storage cells for storing reading medium affixed barcode labels, a recording/reproducing device for either recording or reproducing information using the reading medium, a medium conveyor for conveying the reading medium between the medium storage and the recording/reproducing device, and a reader for optically reading the barcode labels of the reading medium carried on the medium conveyor by line scanning with one-dimensional imaging pixels, the method for controlling the library apparatus comprising the steps of:

an inventory processing step for reading the barcode labels of the recording medium by scanning a plurality times per one label as moving the medium conveyor and notifying of stored medium information; and a cause of error specification processing step for determining the presence or absence of the barcode label by extracting the error data from the reading result obtained by the inventory processing step, executing a predetermined retry process if a barcode label exists and reporting a determination result without executing the retry process if a barcode label does not exist.

18. The method for controlling the library apparatus according to claim 17, wherein the cause of error specification processing step causes a label determination processing step to execute a determination process based on the assumption that a barcode label does not exist if all of the plurality of scanning data for one recording medium are error data and the reading results of the ahead and behind recording medium are normal.

19. The method for controlling the library apparatus according to claim 18, wherein the label determination processing step determines whether a barcode pattern exists or not in the scanning data determined to be an error and if the barcode pattern does not exist, a determination is made to be no label provided that more than a threshold value of black pixels or white pixels sequence exists at the center of data.

20. The method for controlling the library apparatus according to claim 19, wherein the label determination processing step determines the presence or absence of a start code or a stop code if the barcode pattern exists in the scanning data determined to be an error, and determines to be no label provided that more than a threshold value of black pixels or white pixels sequence exists at the center of data if neither the start code nor the stop code exists.

21. The method for controlling the library apparatus according to claim 19, wherein the label determination processing step determines whether a N/W ratio and a thin element width are within a standard value if at least either start code or stop code exists in the scanning data determined to be an error, determines to be no label provided that more than a threshold value of black pixels or white pixels sequence exists at the center of data if the N/W ratio and the thin element width are within a standard value.

* * * * *